United States Patent [19]

Manabe et al.

[11] Patent Number: 5,339,239
[45] Date of Patent: Aug. 16, 1994

[54] INFORMATION COLLECTING AND/OR SERVICE FURNISHING SYSTEMS BY WHICH A USER CAN REQUEST INFORMATION FROM A CENTRAL DATA BASE USING A PORTABLE PERSONAL TERMINAL AND AN ACCESS TERMINAL

[75] Inventors: Toshiyuki Manabe; Osamu Murakami, both of Tokyo; Keiichi Takeuchi, Hiratsuka; Junichi Matsuura, Tokyo, all of Japan

[73] Assignees: Mitsubishi Plastics Industries Limited, Tokyo; Hudson Soft Co., Ltd., Sapporo; JAL Data Communication & Systems Co., Ltd., Tokyo, all of Japan

[21] Appl. No.: 596,707

[22] Filed: Oct. 11, 1990

[30] Foreign Application Priority Data

Oct. 13, 1989 [JP] Japan .................................. 1-265087
Nov. 30, 1989 [JP] Japan .................................. 1-311551
Nov. 30, 1989 [JP] Japan .................................. 1-311552
May 22, 1990 [JP] Japan .................................. 2-131924
Jun. 7, 1990 [JP] Japan .................................. 2-60524[U]

[51] Int. Cl.$^5$ ............................................. G06F 15/40
[52] U.S. Cl. ............................. 364/401; 364/419.19; 235/375
[58] Field of Search ............... 364/401, 402, 403, 407, 364/419, 419.19; 235/492, 379, 380, 375

[56] References Cited

U.S. PATENT DOCUMENTS

| | | | |
|---|---|---|---|
| 4,277,837 | 7/1981 | Stuckert | 364/408 |
| 4,634,845 | 1/1987 | Hale et al. | 235/379 |
| 4,745,265 | 5/1988 | Douno et al. | 235/379 |
| 4,764,666 | 8/1988 | Bergeron | 235/380 |
| 4,877,947 | 10/1989 | Mori | 235/379 |
| 5,034,596 | 7/1991 | Utsunomiya | 235/380 |
| 5,149,945 | 9/1992 | Johnson et al. | 235/492 |
| 5,162,989 | 11/1992 | Matsuda | 364/401 |
| 5,189,287 | 2/1993 | Parienti | 235/379 |

Primary Examiner—Robert A. Weinhardt
Attorney, Agent, or Firm—Oblon, Spivak, McClelland, Maier & Neustadt

[57] ABSTRACT

An information collecting system comprises an access terminal connectable to a data base through a network and a host computer, an IC memory card adapted for removable insertion into the access terminal, and a portable personal terminal. Requests for an item of information, from a customer, are inputted and recorded in the IC memory card using the personal terminal and the IC memory card is inserted into the access terminal. The request for information is transmitted through the access terminal to the data base and the requested information, transmitted from the data base, is stored in the IC memory card. Thereafter, the IC memory card, storing the information, is inserted into the personal terminal whereby the requested information is displayed on a display formed in the personal terminal.

8 Claims, 20 Drawing Sheets

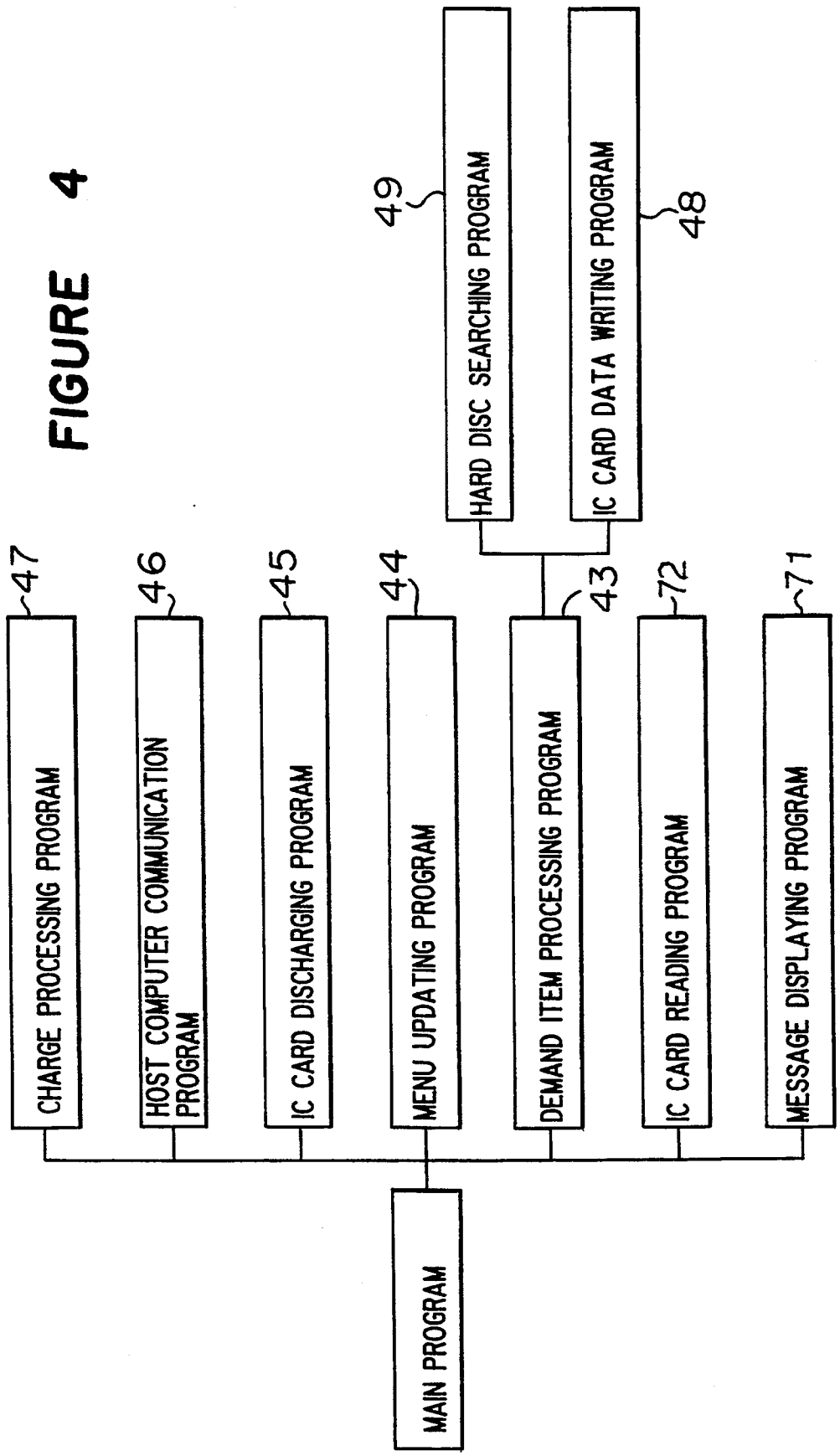

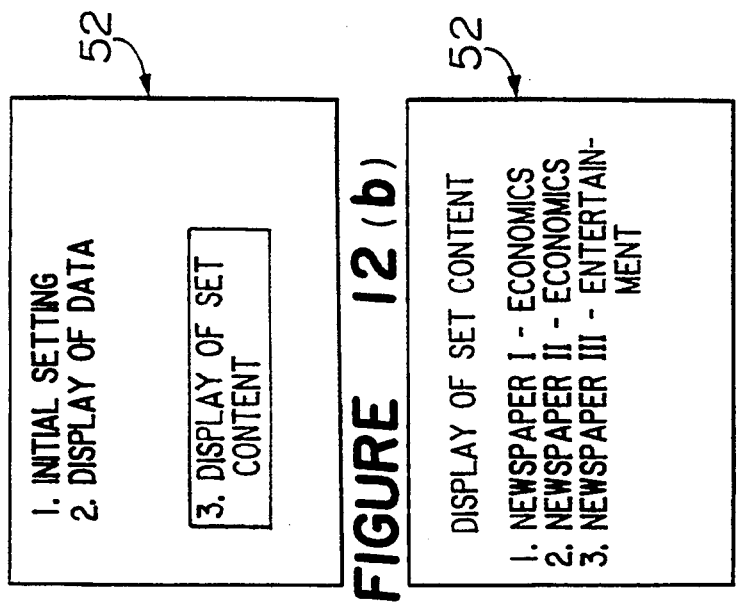
FIGURE 12(a)
FIGURE 12(b)
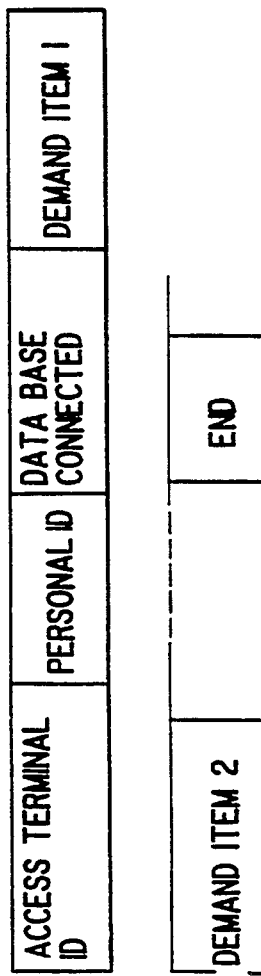
FIGURE 6
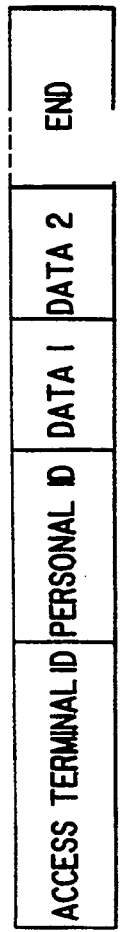
FIGURE 7

G: COMPANY FOR FURNISHING SERVICES
I: SIGNAL TRANSMISSION DEVICE
201: SIGNAL RECEIVING DEVICE
101: PORTABLE TERMINAL

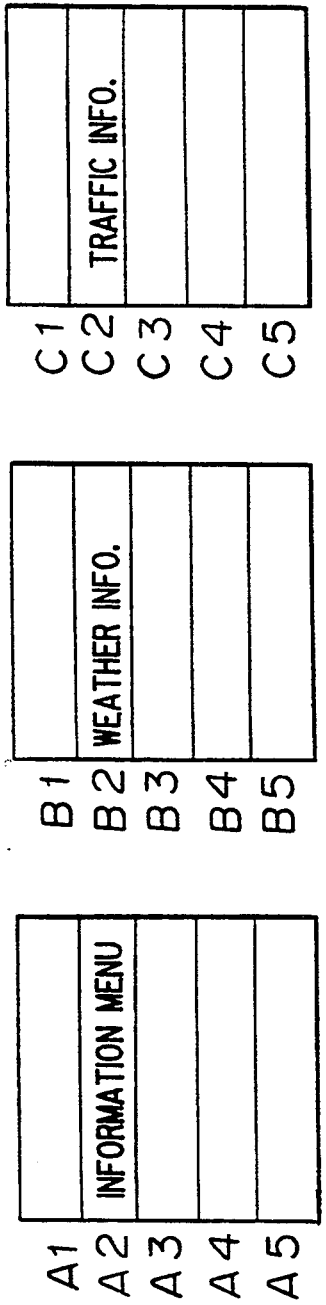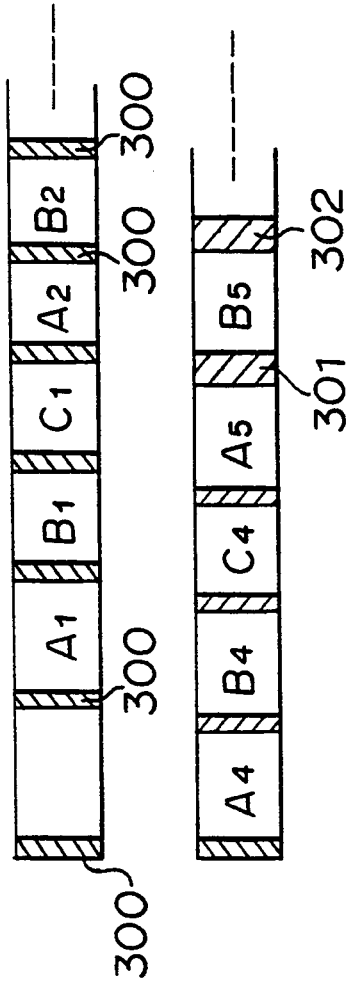
FIGURE 22(a)  FIGURE 22(b)  FIGURE 22(c)
FIGURE 23

INFORMATION COLLECTING AND/OR SERVICE FURNISHING SYSTEMS BY WHICH A USER CAN REQUEST INFORMATION FROM A CENTRAL DATA BASE USING A PORTABLE PERSONAL TERMINAL AND AN ACCESS TERMINAL

BACKGROUND OF THE INVENTION

1. Field of the Invention

The present invention generally relates to information service systems or other service oriented systems which employ a portable display terminal for personal use, wherein the portable display terminal is capable of collecting and storing information, in association with an IC memory card, including written and/or graphics information available from radiowaves, leased telephone lines and public telephone lines.

2. Discussion of the Background

Examples of information services employing communication networks include VIDEOTEX services, services accessed using a personal computer, and services accessed via devices available publicly, for example, in the streets. In the VIDEOTEX services and services accessed via personal computers, a terminal for inclusive use, or a personal computer, is connected to a leased or a public telephone line, and information is supplied to specified members from on-line information services via the terminal or personal computer.

In the above-mentioned conventional VIDEOTEX services and services accessed by personal computers, it is necessary for common users to have at least a terminal capable of providing a telecommunication function by which information is accessible. If the users don't have such terminal, they can't obtain information other than printed data, in the form of written and/or graphic data, provided by means of a printer. Therefore, one drawback of these conventional arrangements is that the users are required to install a relatively large, expensive device in order to receive information. Further, there has been a problem that only specified persons can receive such services.

In service arrangements accessed through communication via devices installed publicly, persons, other than specified members, can receive information by using terminals installed in streets and buildings without fees or with payment by coins.

In these service arrangements accessed publicly, there are drawbacks because data cannot be obtained at places other than those locations where the devices were installed, a considerable amount of time is required to print data, and information cannot be obtained quickly when a large amount of data is requested.

Further, with respect to requested service arranging systems for the pre-engagement of goods or services, since various fields of industry and enterprise use different systems, a unified request service arranging system, covering widely different kinds of services, is not known.

Additionally, with respect to service industries which collect answers to questionnaires concerning marketing surveys and the like, typically, the questionnaires are printed and distributed to unspecified persons and once answered, the questionnaires are collected and the obtained answers are analyzed. However, such an approach requires a large expense, is labor intensive and experiences difficulty in selecting persons for survey.

SUMMARY OF THE INVENTION

Therefore, it is an object of the present invention to provide a system for requesting and receiving various kinds of service information, by using a portable personal terminal having an information recording medium, such as an IC memory card, from an access terminal which is connected to an organization for furnishing the desired service information through a network and a host computer.

More specifically, an object of the present invention is to provide an information service system wherein members, who are registered with organizations for furnishing various kinds of services, or ordinary users, can easily and quickly collect desired information, such as information concerning newspaper articles, advertisements, as well as trips or entertainment, by using IC memory cards, when the members or users are located in towns or stations on the way to or from home or business, so that they can look at the collected information, stored in the IC memory cards, at a suitable place and time.

Another object of the present invention is to provide a requested service arranging system wherein members, registered with organization for furnishing services, or ordinary users, can obtain advance tickets for entertainment, preengage taxis, make advance orders of foods and other goods, reserve trip schedules, as trains or hotels, preengage books or magazines, settle payments through bank accounts or prepaid cards, at facilities located at stations, or a questionnaire collecting system wherein a questionnaire collecting organization can quickly, easily and economically collect the results of answered questionnaires from members who belong to the organization. Another object of the present invention is to provide a personal terminal capable of obtaining written and/or graphic information, as well as the above-mentioned various kinds of information, through radiowaves or telephone lines.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a block diagram showing programs stored in a ROM of the access terminal;

FIGS. 6 and 7 are diagrams showing communication formats used for executing the process of FIG. 5;

FIG. 11a through 11e, FIGS. 12a and 12b and FIGS. 13a through 13f are diagrams showing the function for recording demand items using the personal terminal;

FIGS. 22a through 22c are diagrams showing examples of divided information files;

FIG. 23 is a diagram showing examples of information file format for transmission.

DETAILED DESCRIPTION OF PREFERRED EMBODIMENTS

Figure 1:
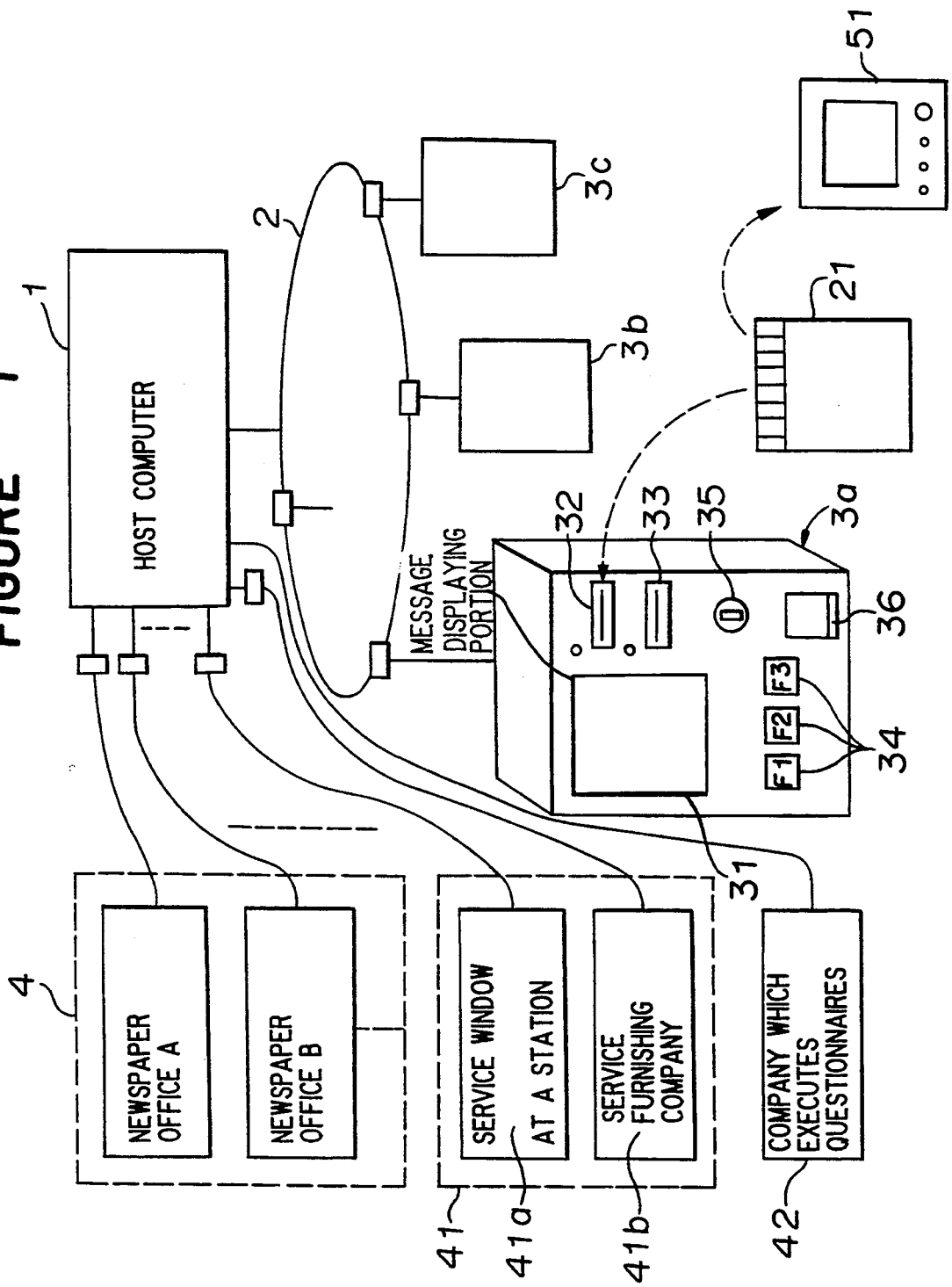
FIG. 1 is a block diagram showing one embodiment of a system according to the present invention.

In the following, preferred embodiments of the present invention will be described in detail with reference to the drawing figures.

FIG. 1 is a block diagram showing one embodiment of the information collecting and/or service furnishing system of the present invention. In FIG. 1, reference numeral 1 designates a host computer for the system, numeral 2 designates a network, such as VAN, numerals 3a, 3b, 3c designate a plurality of access terminals connected to the network 2, numeral 4 designates a host computer of a data base and numeral 41 designates a service furnishing facility connected to the host computer 1 through communication lines, the service furnishing facility including a service window 41a at a station or a company 41b for furnishing services. Reference numeral 42 designates a company which conducts surveys employing questionnaires, numeral 21 designates an IC memory card and numeral 51 designates a terminal for personal use (a personal terminal).

The host computer 1 is connected to the plurality of access terminals 3a, 3b, 3c through the network 2 and is connected directly, or through a communication line, to the host computer 4 of the data base. The network 2, the host computer 1 and the host computer 4 of the data base may be conventional systems.

A detailed description will now be made of the individual elements constituting the information collecting and/or service furnishing system of the present invention wherein information is collected by accessing the host computer 4 provided at the data base.

IC Memory Card

Figure 2:
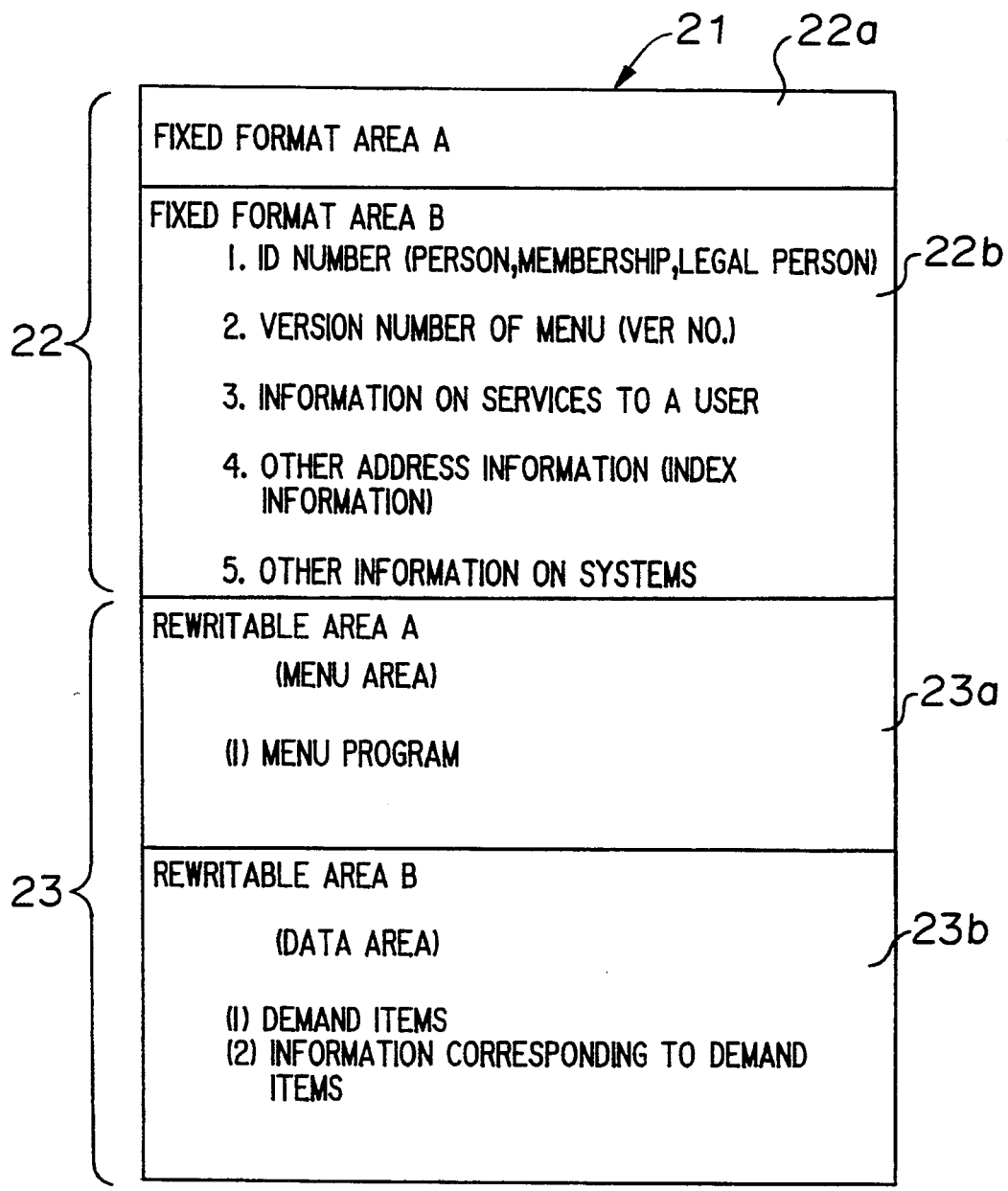
FIG. 2 is a schematic illustration of one embodiment of an IC memory card for use with the system of the present invention.

FIG. 2 shows one embodiment of data areas stored in the IC memory card 21. The IC memory card 21 has a system administration area 22 and a user area 23. The system administration area 22 is divided into a first fixed format area 22a, incapable of being rewritten, and a second fixed format area 22b capable of being rewritten. The user area 23 is divided into a first rewritable area (menu area) 23a and a second rewritable area (data area) 23b.

The second fixed format area 22b stores system administration information. Specifically, it includes, for example:

(1) ID number (a number for identifying a person, a membership or a legal person);

(2) version number of menu for identifying the menu (Vet, No);

(3) information on services available to a user;

(4) address information (index information) other than the service information; and (5) other information on the system.

The data in the system administration area 22 can be written in only by organizations which furnish services and cannot be accessed by users. The version number identifying the menu and part of the address information of the system administration information are altered automatically to incorporate new information resulting from a change of services, by putting the IC memory card 21 in one of the plurality of access terminals 3a, 3b, 3c.

The rewritable area 23a of the user area 23 contains menus on available information which is kept in the host computer 1. The menus may be supplied from organizations which belong to different fields of services, or may be obtained through the access terminals 3a, 3b, 3c. The data area 23b holds menus of requested information to be selected, i.e. demand items, and holds the information from a data base, which corresponds to a selected demand item or items.

Access Terminal

The construction and function of one of the plurality of access terminals 3a, to which the IC memory card 21 is to be inserted, will now be described.

As illustrated in detail in the access terminal 3a of FIG. 1, each of the access terminals 3a, 3b, 3c is provided with a message displaying portion 31, insertion port 32 for receiving the IC memory card 21, an insertion port 33 for receiving a prepaid card or a credit card, function keys 34, a coin receiving port 35 and a change returning port 36. The coin receiving port 35 and the change returning port 36 are not always required, and therefore they may be omitted.

Figure 3:
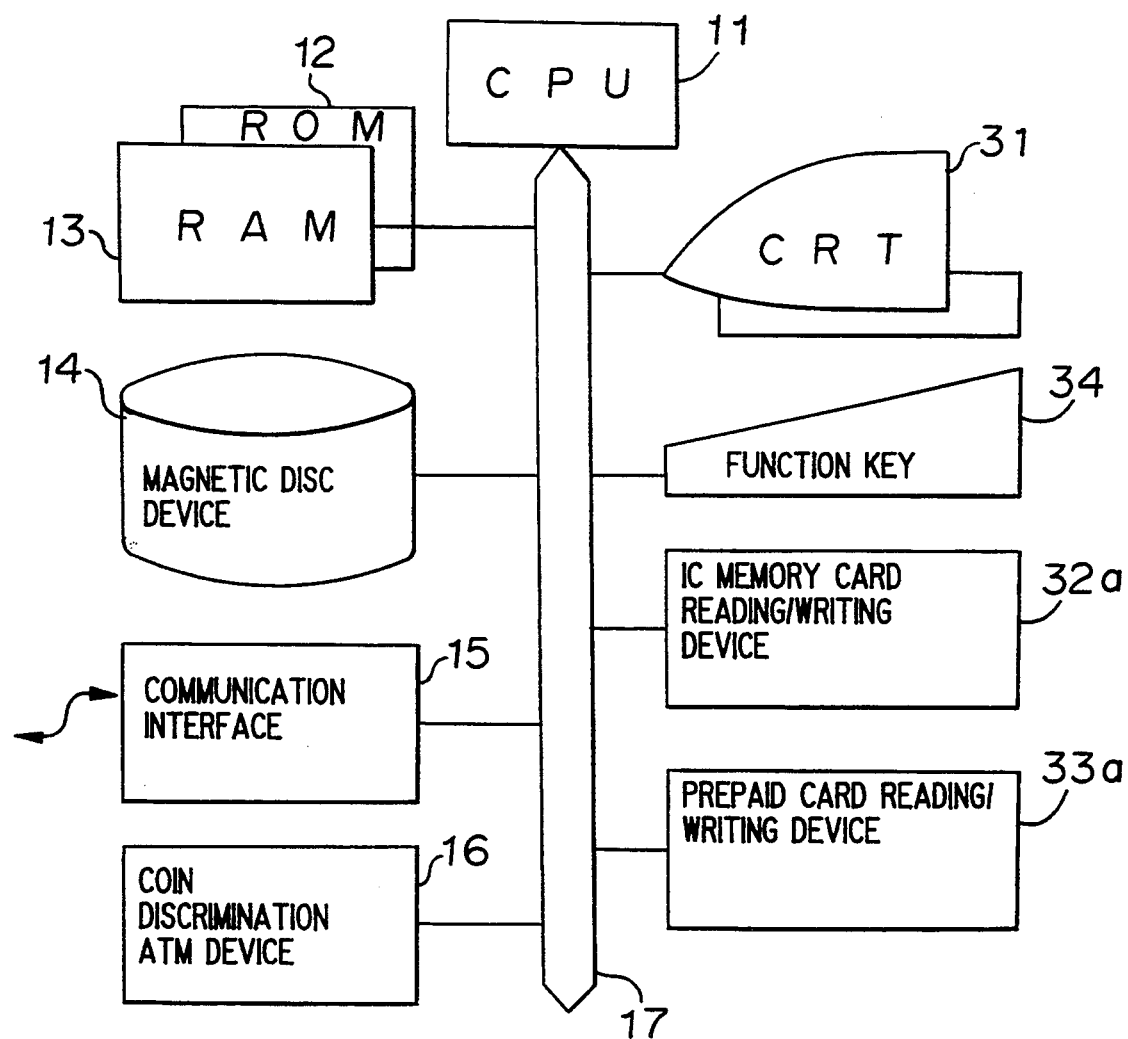
FIG. 3 is a block diagram showing one embodiment of an access terminal for use with the system of the present invention.

FIG. 3 shows one embodiment of the structure of the access terminal 3a. In FIG. 3, the same reference numerals as in FIG. 1 designate the same elements. Reference numeral 11 designates a CPU, numeral 12 designates a ROM which stores programs relating to the function of the access terminal 3a and numeral 13 designates a RAM which holds information received from and transmitted to a communication interface which will be described in more detail hereinafter.

Numeral 14 designates a magnetic disc device which stores information of the type which does not change for a long time, such as information concerning sightseeing, fortune-telling or the like. Numeral 15 designates a communication interface which functions to receive and transmit information between the host computer 1 and the access terminal 3a via the network 2. Numeral 16 designates a coin discrimination ATM device, numeral 17 designates a communication bus, numeral 32a designates an IC memory card reading/writing device, and numeral 33a designates a prepaid card reading/writing device.

The function keys 34 include a stop key F1, an auxiliary key F2 and a trouble alarm key F3 (FIG. 1). On depressing the stop key F1, the operation of the access terminal 3a is stopped and an IC memory card or a prepaid card inserted in the access terminal 3a is discharged. When the trouble alarm key F3 is operated, an alarm is transmitted to a fault repairing section. Thus, the function keys 34 perform auxiliary functions for the access terminal 3a.

The magnetic disc device 14 and the coin discrimination ATM device 16 are not always necessary, and therefore, they may be omitted.

The ROM 12, shown in FIG. 3, stores programs such as shown in FIG. 4, i.e. a message displaying program 71, an IC memory card reading program 72, a demand item processing program 43, a menu up-dating program 44, an IC memory card discharging program 45, a communication program to a host computer program 46, a charge processing program 47, an IC memory card data writing program 48 and a hard disc searching program 49. These programs are operated in a predetermined order so that the program steps, as shown in FIGS. 5A-5B are performed as described below.

Operation of Access Terminal

Figure 5A:
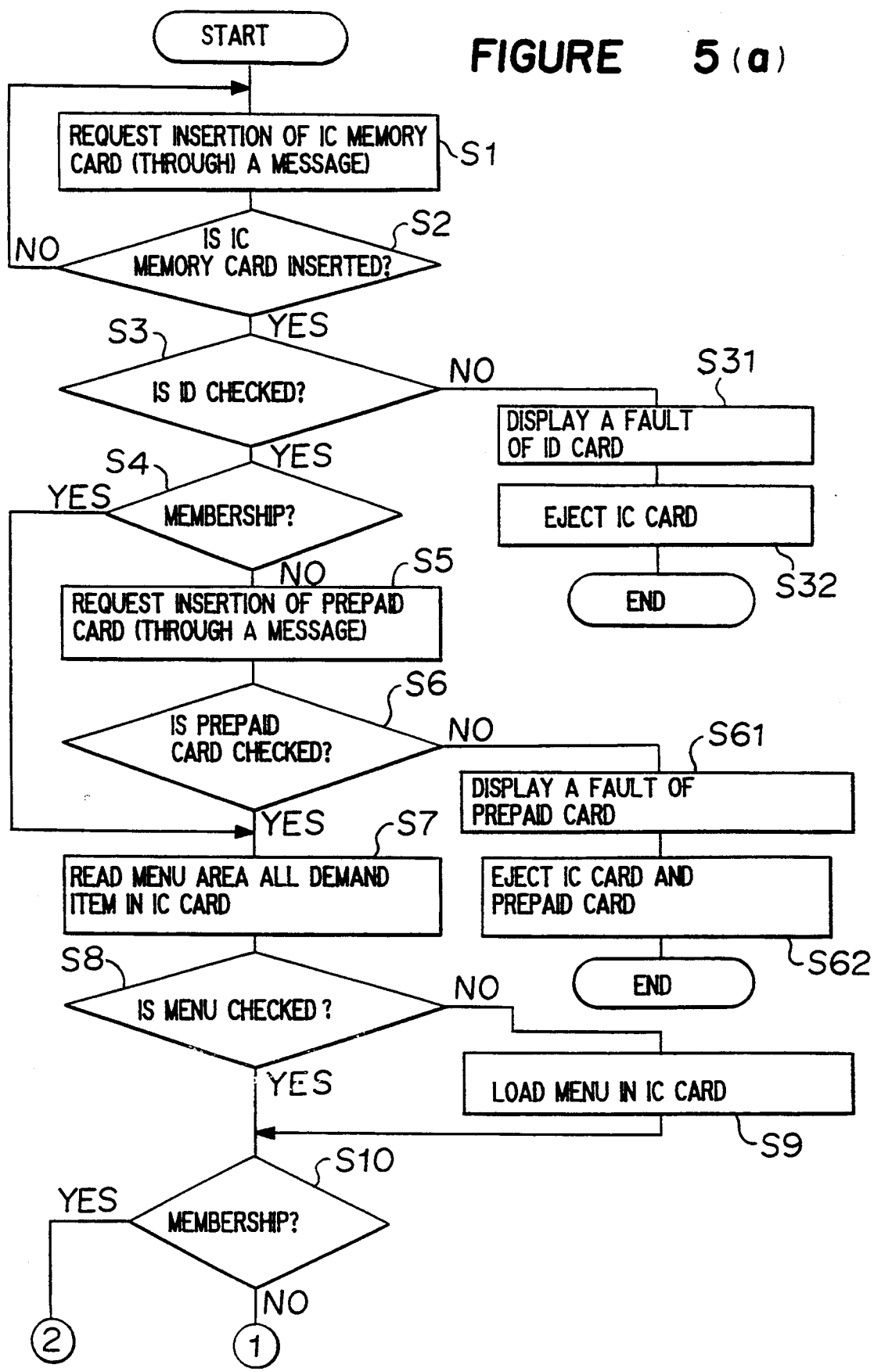
FIGS. 5A and 5B are flow charts showing an operation of the access terminal in accordance with one embodiment thereof.

FIGS. 5a and 5b are flow charts showing the function of the access terminal 3a. Initially, a message requesting insertion of an IC card is displayed on the message displaying portion 31 (step S1). The message may be, for instance, "Please insert an IC memory card". Subsequently, determination is made as to whether or not the IC memory card has been inserted (step S2).

When the determination is affirmative, then, determination is made as to whether or not the IC memory card inserted in the access terminal is a genuine card which is qualified to receive available services (step S3). Such determination is made by checking the ID number recorded in the system administration area of the IC memory card. When the determination is not affirmative, a display of "ID card not in order" is provided at step S31. Then, the IC memory card is discharged (step S32).

When the determination at step S3 is affirmative, then, determination is made as to whether or not the identified IC card user is a member who can receive the services (step S4) without requiring prepayment. When it is true, i.e. membership of user is affirmed, the program proceeds directly to process step S7 because it is unnecessary for the members to pay fees each time services are requested. On the other hand, in a case of non-membership (the determination at step S4 is negative), a message requesting insertion of a prepaid card is provided (step S5). Such message may be "Please insert a prepaid card", for instance.

When the prepaid card has been inserted, a check is made as to whether or not the prepaid card is a genuine one (step S6). If the prepaid card is not genuine, a display is provided that the prepaid card is not in order (step S61). Then, the prepaid card is discharged together with the IC memory card (step S62) and processing is terminated.

On the other hand, when a genuine prepaid card has been inserted, the menu area 23a and all demand items in the data area 23b of the IC memory card are read at step S7. Then, determination is made as to whether or not the contents of the menu area 23a coincide with the latest menus kept in the access terminal 3a (step S8). When the determination is negative, the latest menus are loaded in the IC memory card at step S9, whereby users can be supplied with the latest information of available services. In a case of non-membership (i.e. the determination at step S10 is negative), fees required for the services corresponding to the all demand items stored in the IC memory card are compared with the amount of credit recorded in the prepaid card (step S11). At this moment, an indication in the displaying portion may be "$0.00 remaining", for instance.

When the remainder on the prepaid card is less than the total amount of the fees required for the services corresponding to a requested demand item or items (i.e. the determination at step S12 is negative), an indication of a shortage of credit is provided and insertion of an additional prepaid card is requested (step S13). When an additional prepaid card has been inserted (the determination of step S14 is affirmative), the program returns to step S11, and the fees required for the services corresponding to the all requested demand items are compared with the remainder recorded on the prepaid card.

When the determination of step S12 is affirmative, and the user has a membership, processing of the demand items recorded on the IC memory card is carried out (step S15). Namely, when the demand items are available from the host computer 4 at the data base (FIG. 1), the access terminal 3a communicates with the host computer 1 through the communication interface 15 (FIG. 3) and the network 2 (FIG. 1) so that the data corresponding to the demand items are accessed and provided from the host computer 4 at the data base. On the other hand, when the demand items are on the magnetic disc device 14 (hard disc device), in the access terminal 3a, the data corresponding to the demand items are obtained directly from the magnetic disc device 14. At this moment, an indication on the display portion may be "Under processing, please wait a moment" for instance.

Thus, the data corresponding to the demand items are collected and written into the IC memory card 21 (step S16). Then, processing for fees to the person who is not membership is carried out (step S17). At the moment, an indication of "$0.00 for fees, and $0.00 remaining, thank you" is made on the displaying portion of the access terminal 3a, for instance. Finally, the IC memory card 21 and the prepaid card are discharged (step S18) to complete the entire processing.

The operation of step S15 will now be described in more detail. The access terminal 3a determines a data base to be connected on the basis of the demand items recorded on the IC memory card 21. Then, the communication format, as indicated in FIG. 6, is prepared by adding the personal ID and the demand items 1, 2, . . . to the identification data of the access terminal 3a, at the communication interface 15.

Thereafter, the communication interface 15 connects the access terminal 3a to the host computer 1 by the aid of a known communicating system, such as HDLC, BSC or the like, whereby the data of the communication format are transmitted to the host computer 1.

The host computer 1 accesses the host computer 4 of the data base on the basis of the information obtained from the access terminal 3a to thereby extract the necessary data from the data base, and the data is returned to the access terminal 3a in a communication format as shown in FIG. 7.

The communication interface 15 of the access terminal 3a extracts data 1, data 2 . . . in the communication format. The extracted data are stored temporarily in the RAM 13 and then, the data are written into the IC memory card 21.

Construction of Personal Terminal

Description will now be made of the personal terminal 51 which is used for writing necessary data into the IC memory card 21, or for recording demand items into the memory card 21, or for viewing and reading the information contained by the IC memory card 21.

Figure 8:
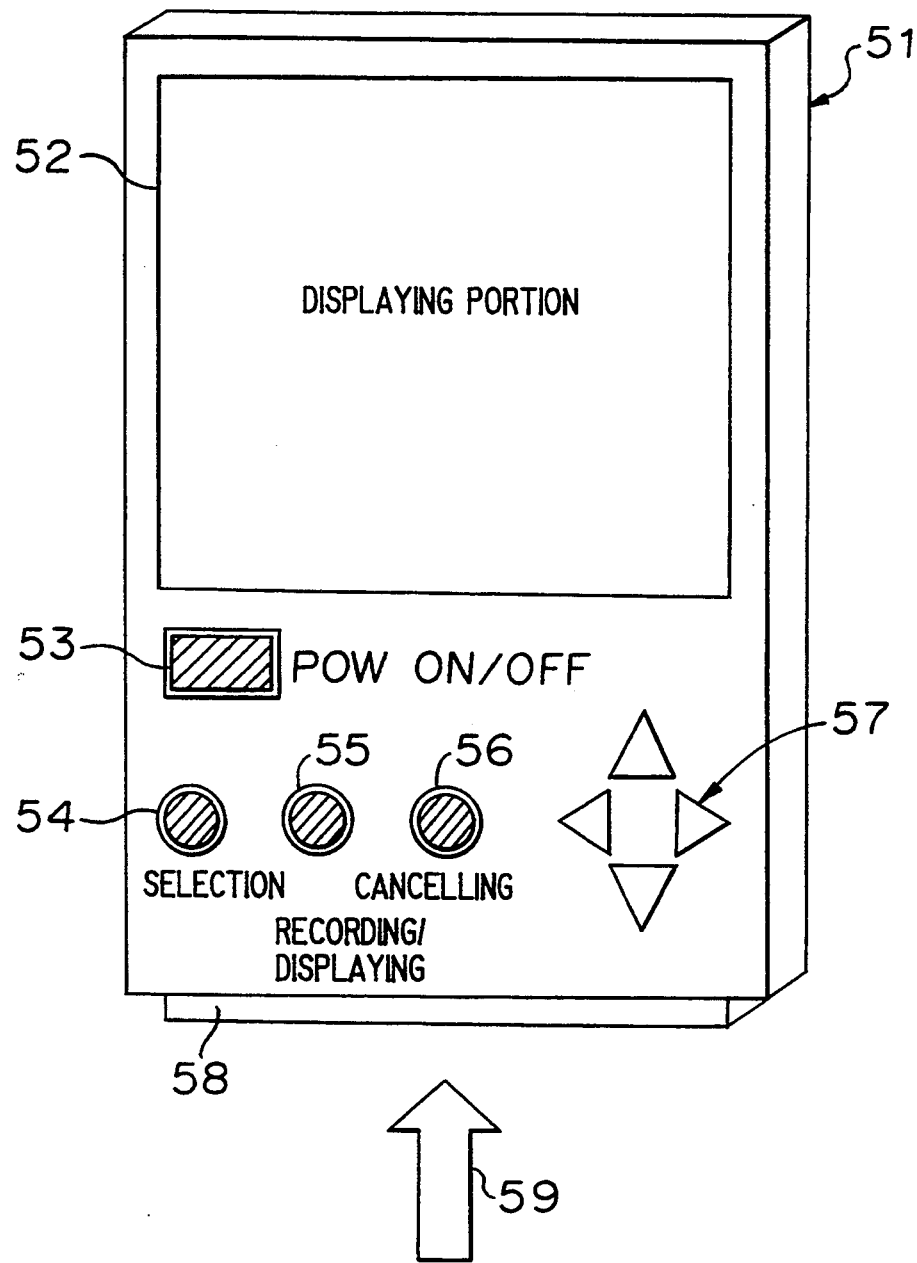
FIG. 8A is a schematic view of one embodiment of a personal terminal according to the present invention.
FIG. 8B is a schematic view of another embodiment of the personal terminal.

FIG. 8A is a perspective view of one embodiment of the personal terminal 51 used according to the present invention. The personal terminal 51 preferably has a size as large as a pocket notebook, i.e., about 80 mm long, 140 mm wide and 10 mm thick in approximate size.

The personal terminal 51 has an insertion port 58 for receiving the IC memory card 21, a displaying portion 52, such as liquid crystal display, at one surface thereof, a switch 53 for turning-on/off a power source, a selecting button 54, a recording/displaying button 55, a canceling button 56 and cursor positioning buttons 57.

The IC memory card 21 is inserted in the insertion port 58 by moving it in the direction of an arrow mark 59.

The displaying portion 52 can display 32 alphabet characters or 16 Chinese characters in a transverse line and can accommodate 8 lines in the vertical direction, for instance. As is well known, since a vertical line in a column accommodates 14 Chinese characters, including Japanese characters in ordinary newspapers, the displaying portion 52 can display 8 vertical lines at once when data of a newspaper are to be displayed. When an amount of data is large, the displaying portion 52 cannot display the data at once. In this case, hidden data are successively displayed on the displaying portion 52 by scrolling the data by operating the cursor positioning buttons 57.

FIG. 8B is a schematic view of another embodiment of the personal terminal 51 of the present invention. In FIG. 8B, the same reference numerals as in FIG. 8A designate elements which perform the same function as those in FIG. 8A. The personal terminal 51 of this embodiment is so constructed that the switch 53, the selecting button 54, the recording/displaying button 55, the canceling button 56, and the cursor positioning buttons 57 are arranged at a side portion or an outer peripheral portion of the casing so that when the personal terminal is hand held, the switch and the buttons are close to the user's fingers. The personal terminal of this embodiment allows operation by a single hand.

Figure 9:
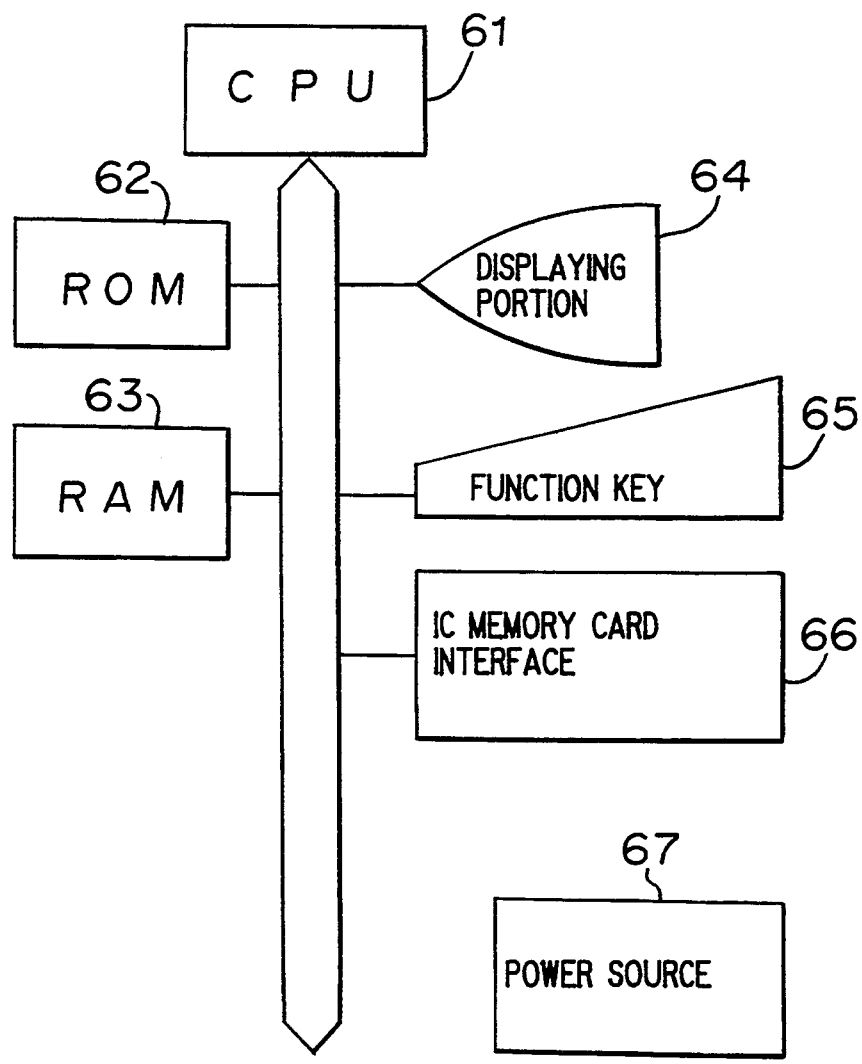
FIG. 9 is a block diagram of an embodiment of the structure of the personal terminal.

FIG. 9 is a block diagram showing a construction of the personal terminal 51. In FIG. 9, reference numeral 61 designates a CPU for control, calculation and determination of operations, numeral 62 designates a ROM which stores a basic program and basic data for operating the terminal 51, numeral 63 designates a RAM to provide areas for executing application programs loaded by the ROM 62 or the IC memory card 21, or for storing various data, numeral 64 designates a displaying portion made of, for example, liquid crystal which displays menus for various kinds of programs and data, numeral 65 designates a functional key section comprising a switching key for turning on/off a power source, cursor positioning buttons for scrolling a content to be displayed by moving a cursor, and buttons for selecting, recording and canceling, numeral 66 designates an interface device for connecting the IC memory card 21 to the personal terminal 51, and numeral 67 designates a power source such as a chargeable battery or a button battery.

Operation of the Personal Terminal

Figure 10A:
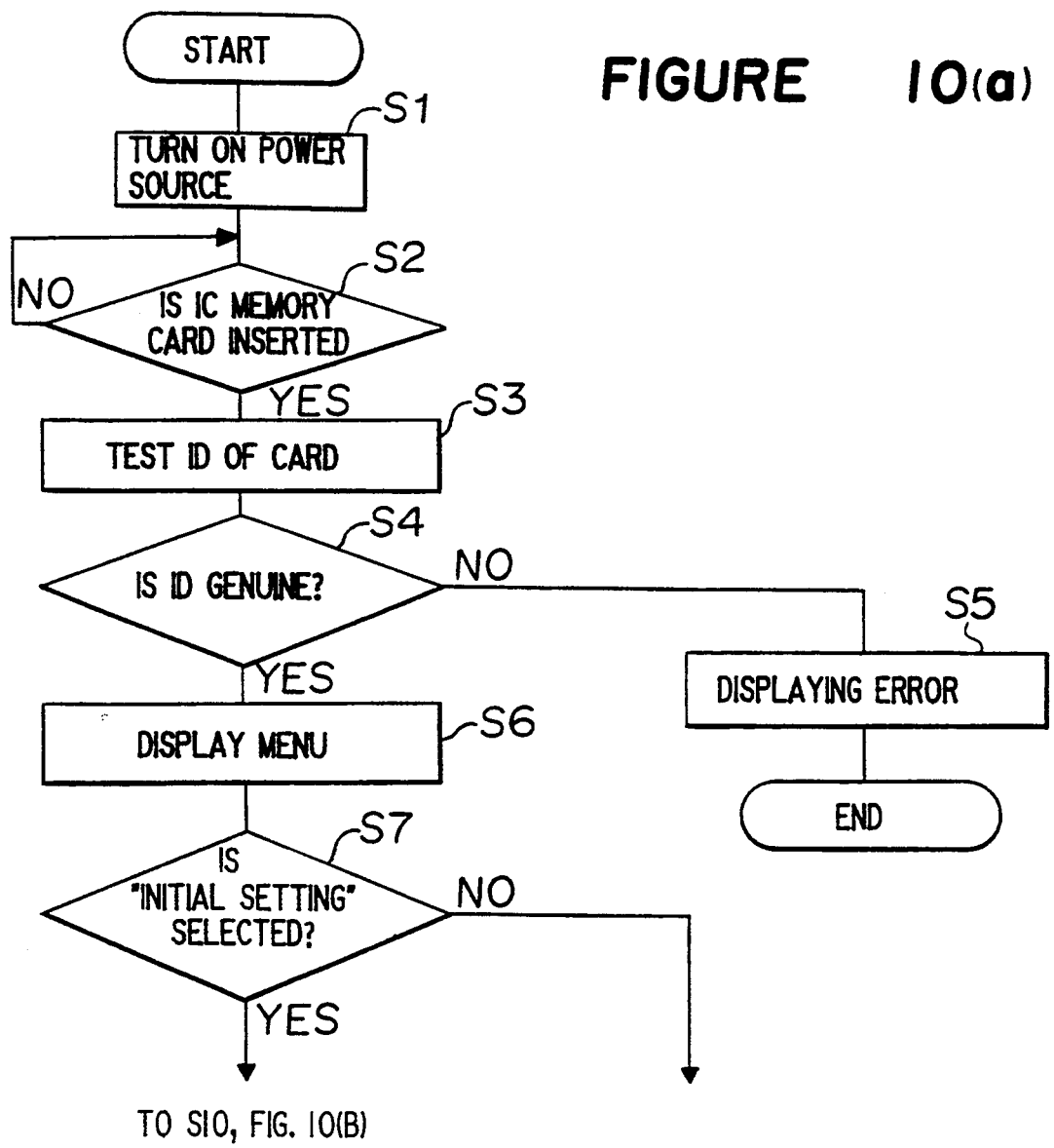
FIG. 10 is a flow chart illustrating an operation of the personal terminal.
Figure 10B:
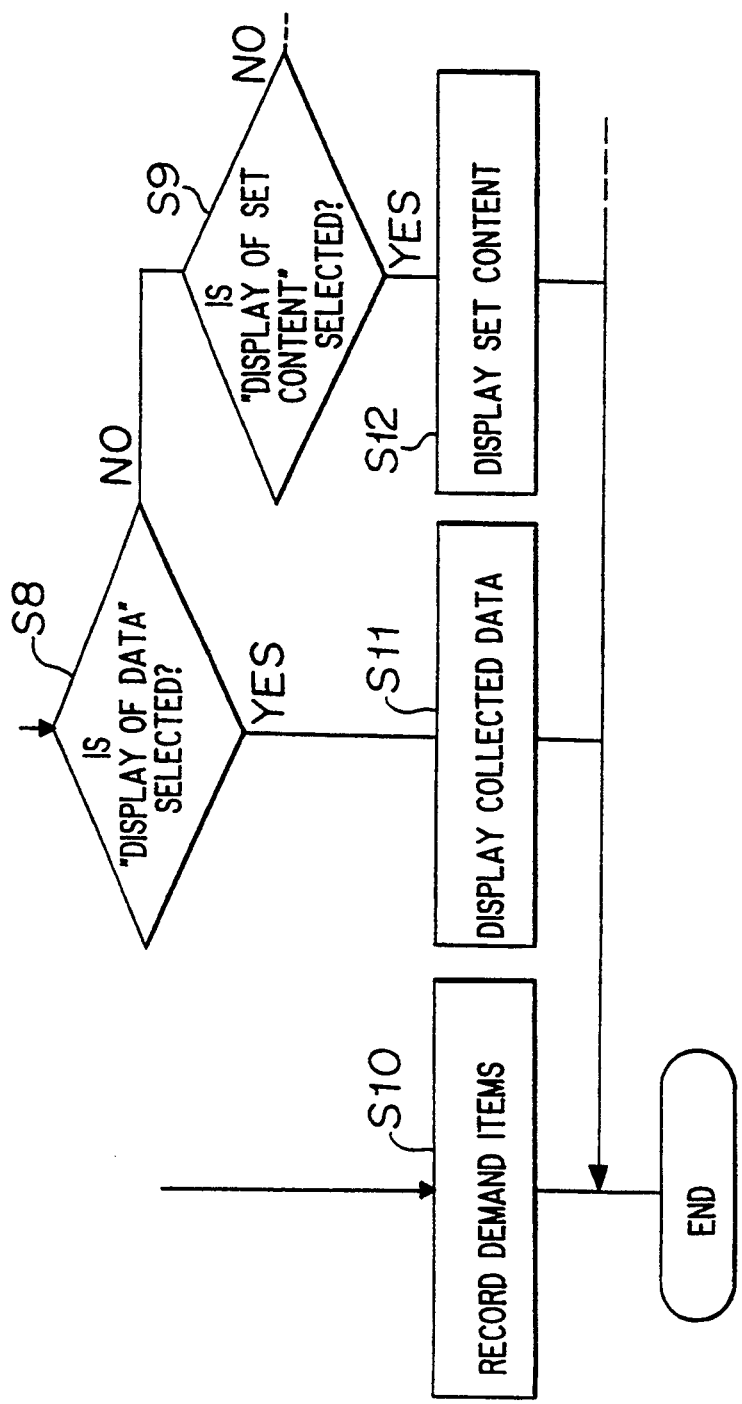

FIG. 10 is a flow chart schematically illustrating the operation of the personal terminal. Initially, the power source 67 is turned on (step S1). Then, determination is made as to whether or not an IC memory card 21 is inserted (step S2). When the determination is affirmative, a check as to whether or not the inserted IC memory card is a genuine one is made (step S3). When the ID memory card is not genuine (when the determination at step S4 is negative), an error display is provided (step S5).

Figure 11A:
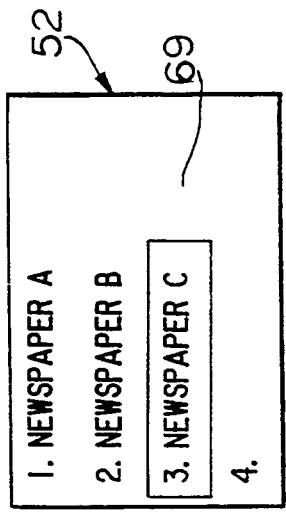

On the other hand, when the ID memory card in genuine, initial menus, such as shown in FIG. 11a, are displayed (step S6). Then, the user selects any one of "initial setting", "display of data" and "display of set content", or the like of the initial menus (step S7, S8 and S9). In the case that "initial setting" is selected (the determination at step S7 is affirmative), an operation of recording a request for demand item for information is conducted (step S10). When "display of data" is selected (the determination at step S8 is affirmative), information transferred from the data base or the magnetic disc device and stored on the IC memory card is displayed (step S11). When "display of set content" is selected (the determination at step S9 is affirmative), all the demand items recorded at step S10 are displayed (step S12).

Recording Demand Items of the Personal Terminal (Step S10)

The recording of demand items of the personal terminal 51 will now be described with particular reference to FIGS. 11a–11e. In this example, although "newspapers" are illustrated as an object of the services stored by the IC memory card 21, the present invention is not limited to this category.

In FIGS. 11a–11e, only the displaying portion 52 of the personal terminal 51 is illustrated, and the functional key arranged on the panel of the personal terminal 51 is omitted from the drawing.

Upon insertion of the IC memory card 21 into the personal terminal 51 and turning on of the power switch 53, an initial menu and a cursor are displayed on the displaying portion 52 as shown in FIG. 11a. In this example, the cursor 69 is positioned at "1. initial setting". The cursor 69 can be moved vertically by operating the cursor positioning buttons 57.

Figure 11B:
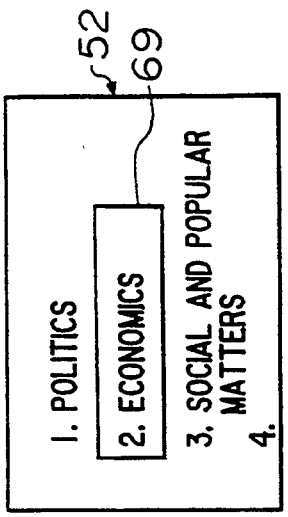
Figure 11C:
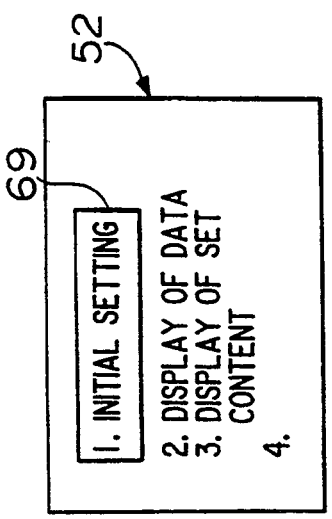
Figure 11D:
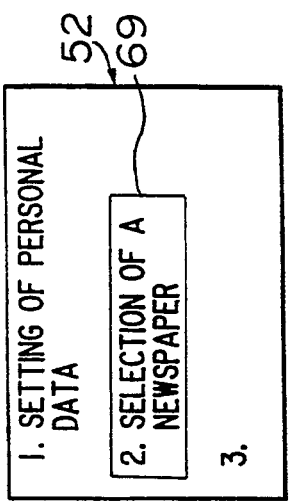
Figure 11E:
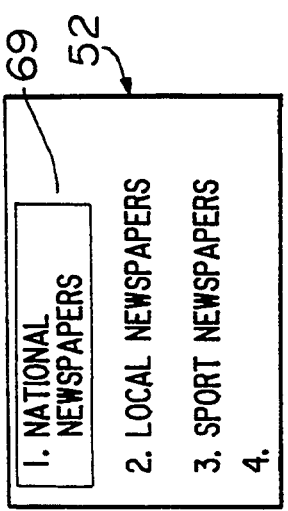

When the selecting button 54 is activated when the cursor 69 is on "1. initial setting", the display on the displaying portion 52 is changed to a state as shown in FIG. 11b. Then, by selecting "2. selection of a newspaper", the display on the displaying portion 52 is changed to a state as shown in FIG. 11c. When "1. national paper" is selected on the display shown in FIG. 11c, a listing, as shown in FIG. 11d, is provided on the displaying portion 52. Here, by the selection of "3. newspaper C", the displaying portion displays a list of topics as shown in FIG. 11e. When the user selects "2. Economics", it is confirmed that the user desires information on the economics section in the newspaper C, namely, that is the final demand item, and a request for information, corresponding to the economics section of the newspaper C, is recorded at a predetermined area in the data area of the IC memory card 21.

When the selection of "2. Economics" is finished, the content of the displaying portion 52 is returned to the original initial menu as in FIG. 11a. The user can again operate the buttons in the same manner as above to select a further information service or demand item if he so desires.

When "3. display of set content", shown in FIG. 12a, is selected after all the information services desired and requested by the user have been set (step S9, FIG. 10), the displaying portion 52 is changed to a state as shown in FIG. 12b whereby all of the content set by the user, i.e. all demand items can be viewed and confirmed.

In the above-mentioned example, the category of "newspapers" is selected. However, other categories such as "time tables, fares, guides for changing trains for railways", "used cars, real estate", "event tours, pictures, videos, concerts and festivals", "inns, hotels" and "divination, religion" can also be provided.

Information Displaying Function of the Personal Terminal (Step S11)

In selecting "2. display of data" from the initial menu as in FIG. 11a, information obtained from the data base through the host computer 1 or from the magnetic disc device and stored in the data area of the IC memory card 21 is displayed.

When the content of information cannot be displayed all at once on the displaying portion 52 of the personal terminal 51, because the amount of information is large, the cursor positioning buttons 57 are operated whereby information which has not been displayed appears on the displaying portion 52 by scrolling or paging. In this case, hidden information may be displayed by renewing information in each line or each page.

Operations Required for Users in Order to Collect the Information Corresponding to Requested Demand Items Initially a user obtains an IC memory card 21, applicable to the systems according to the present invention, from companies furnishing desired services, as well as prepaid cards from companies furnishing such services when the user does not have a membership belonging to the companies. Then, the user records demand items in the IC memory card 21 by using a personal terminal 51 as previously described. Thereafter the user inserts the IC memory card 21 or the prepaid card in an insertion port of the access terminal 3 whereby the information corresponding to the requested demand items is automatically transmitted to and stored by the data area of the IC memory card 21.

Once this is accomplished, the user inserts the IC memory card 21, which has already been inserted once in the access terminal 3, into the personal terminal 51 and selects "display of data" from the initial menu after the power switch has been turned on. By executing the above-mentioned operations, the information corresponding to the demand items is displayed on the displaying portion of the personal terminal 51.

Thus, the users can collect data corresponding to demand items in the IC memory cards by simply inserting the cards, on which the demand items are recorded, into the access terminals without requiring any special operations. Accordingly, requisite data can be collected or stored in the IC memory cards for a short time so that the user can access it at a desired time. Therefore, it is unnecessary for the users to wait and form long lines to utilize the access terminals even though there are many users, and the users can therefore utilize the access terminals in the same manner as buying newspapers or magazines at stands in stations or streets.

In the case when the users read the information collected on the IC memory cards, the information can be displayed on the displaying portion 52 by simply inserting the IC memory card into a portable personal terminal owned by each user, by turning on the power switch 53, moving the cursor to "display of data" of the initial menu, and operating the selecting button 54. Accordingly, the users can see the data obtained from the access terminals 3a, 3b, 3c at any time and many times. For instance, a user can collect necessary data by inserting the IC memory card into an access terminal installed at a station on the way to work, and can see the data, such information from a newspaper, in a car by inserting the IC memory card into his personal terminal to display the data on the displaying portion. Further, since the personal terminal is as large as a pocket notebook, it is easy to carry, and can be viewed even in a crowded car.

Figure 14:
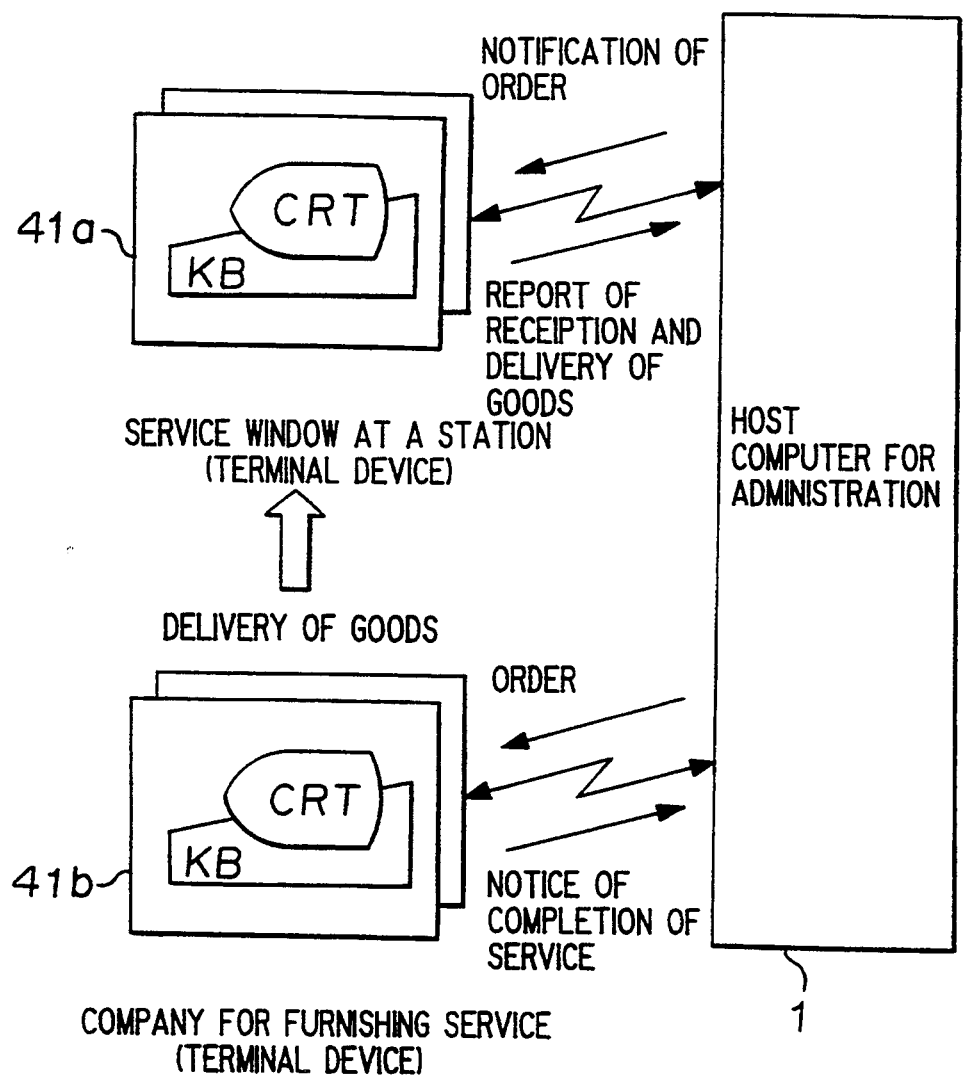
FIG. 14 is a diagram showing an embodiment for arranging requested services according to the present invention.

In the following, an example of furnishing services ordered by a customer will be explained with reference to FIGS. 1 and 14.

A system for furnishing ordered services, according to one embodiment of the present invention, comprises a host computer 1 connected through communication lines to a service window 41a of a service facility 41 or the like and an organization for furnishing services 41b, an access terminal 3 connected to the host computer 1 through a communication line, an IC memory card 21 adapted for removable insertion into the access terminal 3 and a personal terminal 51.

In this example, the IC memory card 21 has a rewritable area 23 (which is the same as the rewritable area in FIG. 2) which stores service menus and data (a content of services requested by a customer) which are inputted by the customer through his personal terminal 51. Generally, the content of services determined by selecting the service menus is stored in the IC memory card 21. However, the IC memory card 21 may store a content of services requested (code data indicative of a content of services to a customer) which is effected by directly inputting the code data.

In the former case, various kinds of service menus classified into various fields of industries and services are stored in a menu area 23a of the IC memory card 21, and the customer selects desired items, using the personal terminal 51, to record the selected demand items into the data area 23b of the memory card 21. Then, when the IC memory card 21 is inserted in an access terminal 3, the services requested are preengaged. For entertainment-related services, the title of a movie, the name of a theater and the number of tickets for preengagement are selected.

Now, a description will be made as to a procedure for receiving a specified service.

Assume that a user has an IC memory card 21 which has been obtained from a company for furnishing services at some expense. An identification code for the card, an ID number for the customer, and a number of service menus are previously incorporated into the IC memory card 21. The customer inputs personal data such as name, sex, age, occupation and so on which are required for receiving services, by means of the personal terminal 51.

Figure 13A:
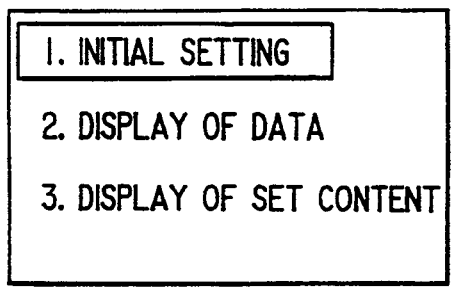
Figure 13D:
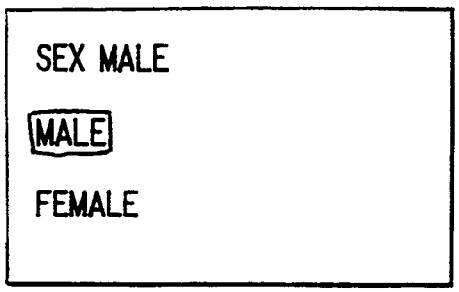
Figure 13B:
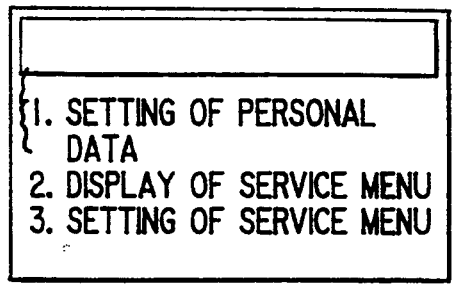
Figure 13E:
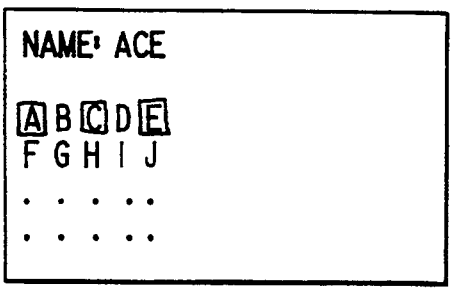
Figure 13C:
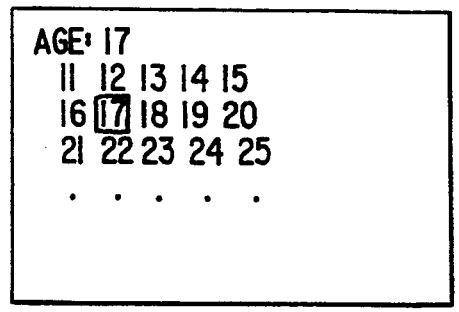

Then, he puts the IC memory card 21 into the personal terminal 51, turns on the power switch 53 and operates the displaying button 55 (FIG. 8) whereby items are displayed on the displaying portion as shown in FIG. 13a. Then, he moves the cursor to "initial setting" by operating cursor keys 57, and operates the selecting button 54, whereby a display, as shown in FIG. 13b, is obtainable. In the same manner, the cursor keys 57 are operated to bring the cursor to the heading "Setting of personal data" followed by operation of the selecting button 54 to thereby select the personal data, which is displayed as shown in FIG. 13c. The operation of initial setting is completed by inputting the items of age, sex, name and required services in the same manner as described above.

Figure 13F:
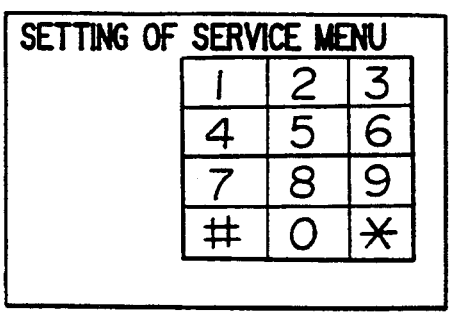

In the case where service menus are previously recorded into the IC memory card 21, the service menus are displayed on the displaying portion of the personal terminal 51 and the desired services are selected by operating the cursor keys 57 and the selecting button 54. Alternatively, it is possible that a display, as shown in FIG. 13f, is provided and the item of service to be requested is recorded directly by inputting a code number or numbers from a list of code numbers which cover various kinds of services in various kinds of industrial field.

Figure 5:
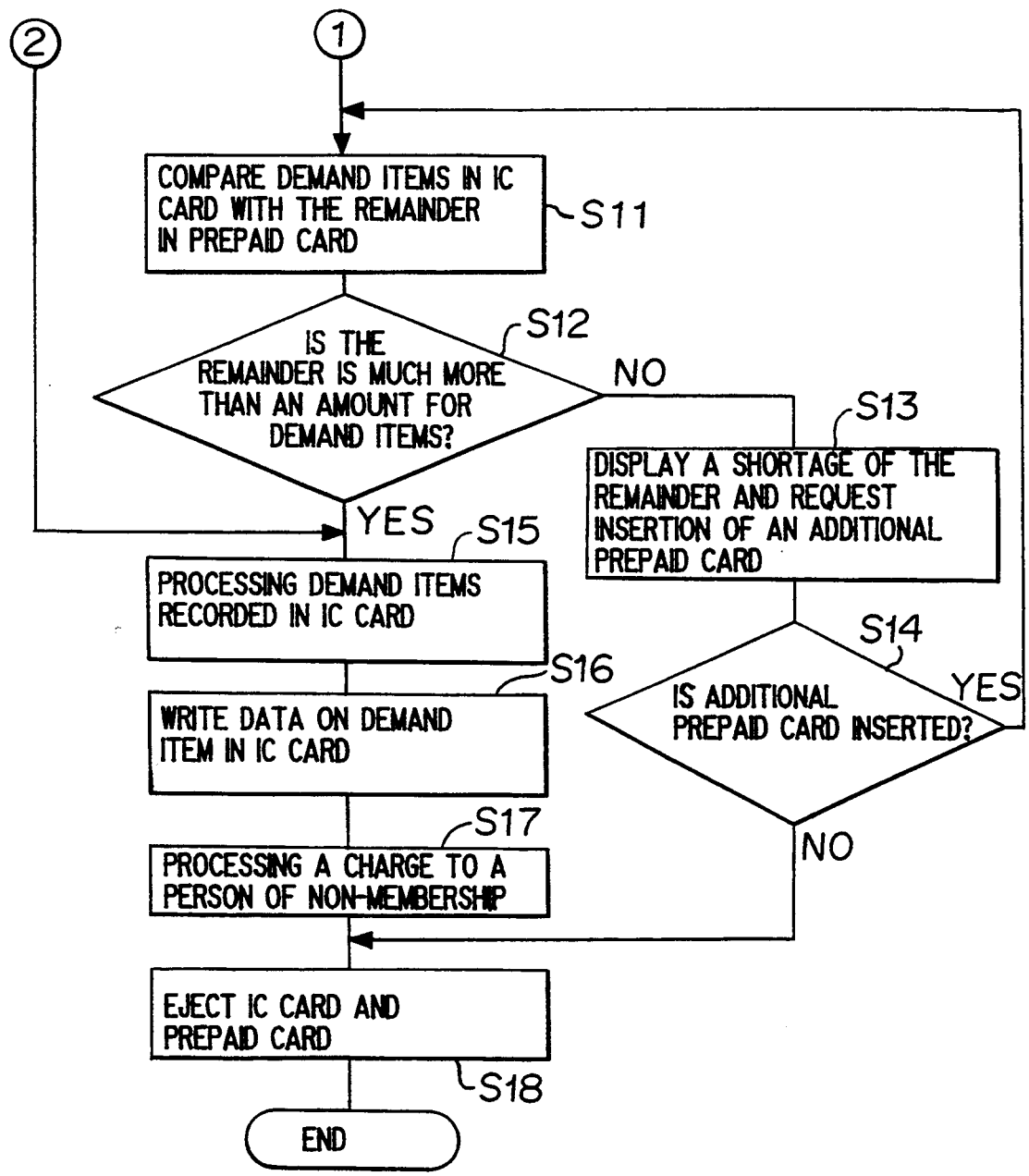

Then, the IC memory card 21, in which the items of services to be required by the user are recorded, is inserted in the access terminal. The access terminal performs substantially the same steps as those of the information processing system from steps S1 to S18 in FIG. 5 except that when the determination, at step S12, is affirmative, and the user is a member belonging to the organization, the request for desired services, as recorded in the IC memory card 21, is processed, and at the same time, the order number for the services is recorded in the IC memory card 21 (step S15). The access terminal 3 transmits the content of the ordered services along with the personal ID and the ID of the access terminal 3 to the host computer 1 through the communication interface 15.

The operation of step S15 will now be described in more detail.

A communication format, as shown in FIG. 6, is prepared at the communication interface 15 of the access terminal 3 by adding the personal ID and demand items (the content of services requested by the customer) to the ID data of the access terminal 3, and the communication format is transmitted to the host computer 1. The host computer 1 collects a large number of requests for services from a large number of customers, from access terminals in different areas, and it transmits orders for the requested services to companies 41b for furnishing services and/or service windows 41a at stations in response to the demand for such services requested by the customers.

At the same time, the host computer 1 operates data concerning the services requested by the customers, and executes operations necessary for sales administration. The request for ordered services to the service windows 41a of stations or to the companies 41b for furnishing services is transmitted through terminal devices installed therein. In the case that the ordered service are goods, the goods are delivered from the companies 41b, for furnishing such a service, to the service windows 41a of a service facility in accordance with the requested orders which are received through communication lines, and information of the completion of the service request is given to the host computer 1.

The transmission of information from the computer 1 to the service windows 4!a is conducted through terminals installed at the services windows 41a. The service windows 41a receive goods from the companies 41b for furnishing such goods in accordance with the notice of orders provided from the host computer 1 and distribute the goods to the customers. Then, the service windows 41a report the details of the reception and the delivery of the goods in a day to the host computer. The host computer 1 may, of course, administrate a stock of goods at the companies 41b for furnishing such goods, or maintain the content of menus to be up-to-date based on information from service furnishing companies, service windows and so on.

Therefore, a user, having an IC memory card 21, can receive goods and many kinds of services from a service window 41a at a station or a company 41 for furnishing such services (where the ID number of the IC memory card 21 and the content of services requested by the user are checked) on the way home, by simply inserting the IC memory card 21 into an access terminal 3 on the way to work in the morning, for instance.

Thus, the user can receive several services by a simple operation i.e. by inserting the IC memory card 21 into an access terminal 3 at a nearby station on the way to work or during a trip. Since the time required for such an operation is short, there is little possibility of forming a line in front of the access terminal 3, and the time for buying or preengaging goods or services can be reduced.

In the following, explanation will be made as to the collection of answers to questionnaires. In this case, the fixed format administration area 22 (FIG. 2) of the IC memory card 21 stores personal data of a member (a person expected to receive answers to questionnaires), such as an ID number, age, sex, occupation of a user, and address information. The major portion of the personal data may be previously inputted into an IC memory card 21 by the seller in response to an order by a user. Alternatively, the major portion of the personal data may be inputted by a user.

Assuming that the rewritable area 23a of the IC memory card is initially empty, the empty portion is filled with a content of a questionnaire by a user by inserting the IC memory card 21 into an access terminal 3 as previously described. The content of a questionnaire is filled in the rewritable area 23a only when data on a user, such as age, sex and occupation, agree with conditions as to whether or not the user is a qualified subject for receiving questionnaires. Further, the company providing the questionnaires can also input an advertisement for the company or the person who asks questionnaires as well as a previous notice on the questionnaires as will be described further hereinafter.

The rewritable area 23b of the IC memory card 21 is to accommodate the answers to the questionnaires when the user inputs his answers to the questionnaires through a personal terminal 51 which will be described hereinafter.

The construction of the system for collecting answers to questionnaires according to the present invention now will be described with particular reference to FIG. 1.

Before collecting questionnaires, various information for collecting the questionnaires is inputted into the host computer 1 including: a previous notice of questionnaires, a content of questionnaires, a list of qualified persons from which answers to questionnaires are collected, and so on, which are determined depending on the requirements of the companies 42 which desire answers to the questionnaires (or market surveying companies) as shown in FIG. 1.

The host computer 1 is connected to relay points provided at several districts and the relay points provided are connected to a large number of access terminals 3 through communication lines, whereby a network for collecting questionnaires is formed. It is desirable that each of the access terminals 3 is provided with a hard disc in which, an application program, the content of questionnaires, conditions to determine qualified persons to answer the questionnaires and so on are stored in order to reduce the load on the host computer 1 and the network for collecting questionnaires.

Now, description will be made as to steps for collecting answers to questionnaires in accordance with the system of the present invention.

Figure 15:
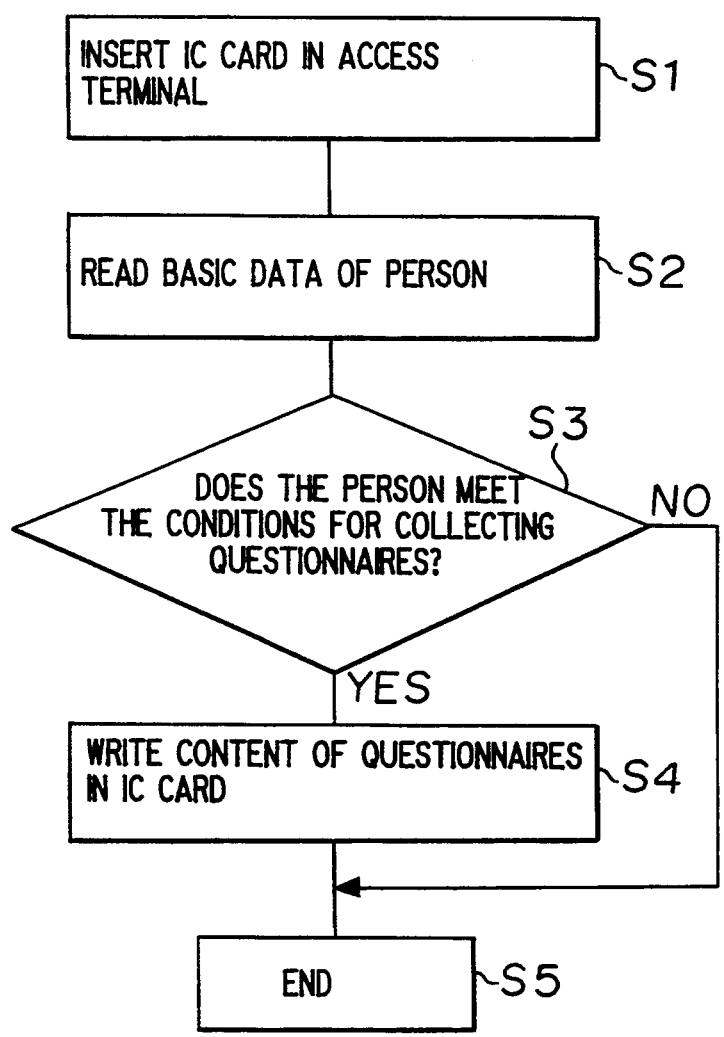
FIGS. 15 and 16 are flow charts showing processes for receiving the contents of a questionnaire.

FIG. 15 is a flowchart showing a process for collecting the questionnaires. An IC memory card holder inserts an IC memory card 21 into the insertion port 32 of an access terminal 3 for collecting questionnaires which is installed in a station (step S1). The access terminal 3 reads the personal data of the IC memory card holder, which are memorized in the IC memory card 21 (step S2), and a check is made as to whether or not the personal data of the holder meet conditions for determining qualified persons to answer the questionnaires (step S3). When the determination is negative, an indication such as "You don't meet the qualified person standard to answer the questionnaires" appears on the displaying portion 31 of the access terminal 3, and the process is ended (step S5).

When the determination is affirmative, an indication such as "The writing-in of the questions to the questionnaires is started" is shown on the displaying portion 31, and the content of questionnaires is written in the IC memory card 21 through the access terminal 3 (step S4). Then, there appears an indication such as "The writing has been finished. Thank you for your cooperation." on the displaying portion 31. Then, the routine is finished (step S5).

In the following, description will be made as to steps required for an IC memory card holder to answer the questionnaires, with particular reference to FIG. 16.

Figure 17:
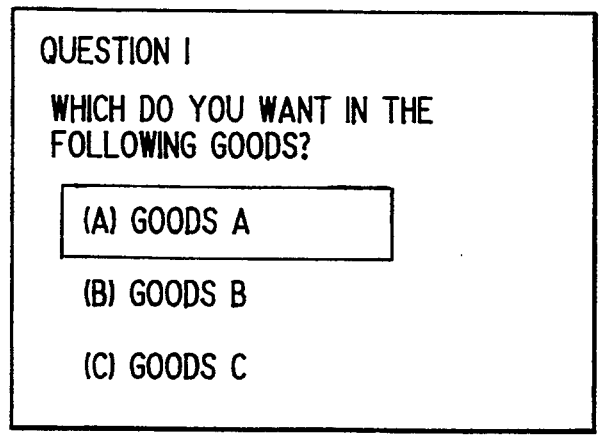
FIG. 17 is a diagram showing questions displayed by the personal terminal.

Assume that the content of the questionnaires is already recorded in the IC memory card 21 held by an IC memory card holder. The person who carries the memory card inserts the card 21 into a personal terminal 51 owned by him. The power switch 53 of the personal terminal 51 is turned on (step S1a) and the recording-/displaying button 55 of the personal terminal 51 is operated. Then, the content of questionnaires is displayed on the displaying portion 52 (step S2a). The cursor keys 57 of the personal terminal 51 are operated so that the cursors moved to an item as shown in FIG. 17. Then, by operating the selecting button 54, an answer (A) is selected and the next question of the questionnaire is displayed.

In the same manner as above, answers are inputted (step S3a). Then, an indication of "Do you wish to change your answers ?" is shown on the displaying portion 52 (step S4a). when there is no change to the answer, the routine is ended by operating the recording-/displaying button 55 (step S5a). When a change is required, the canceling button 56 is operated to return the process to step S2a.

When there are different contents to the questionnaires, however, the same process as described above is executed.

Figure 18:
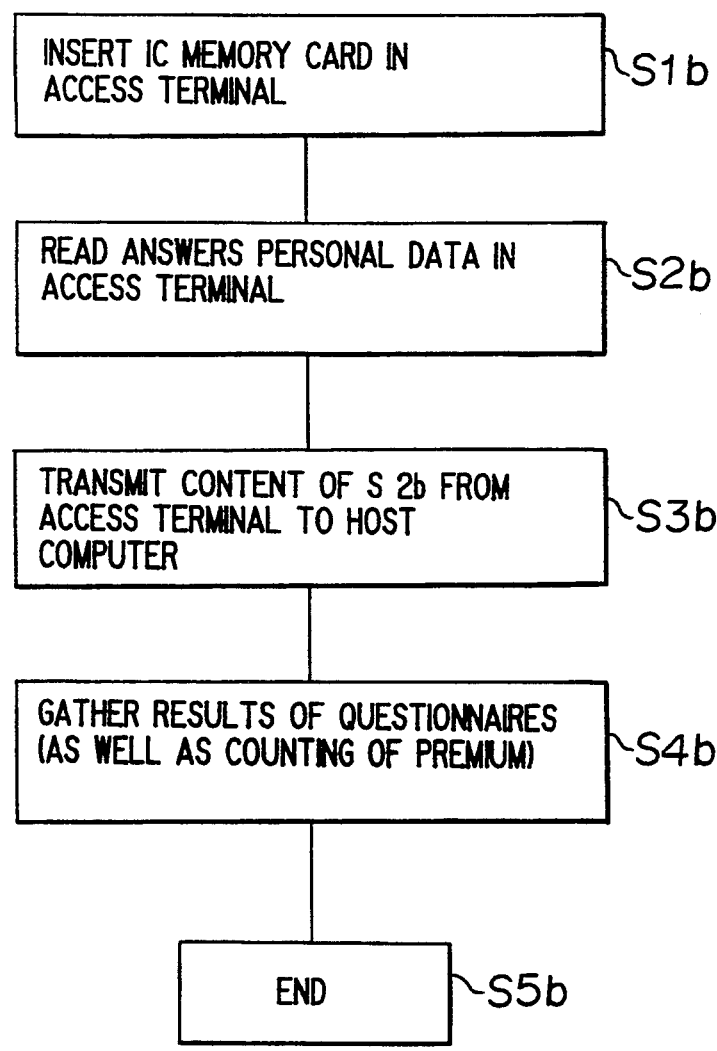
FIG. 18 is a diagram showing a process of collecting questionnaires.

A process for collecting answers to the questionnaires will now be described with reference to FIG. 18.

Figure 16:
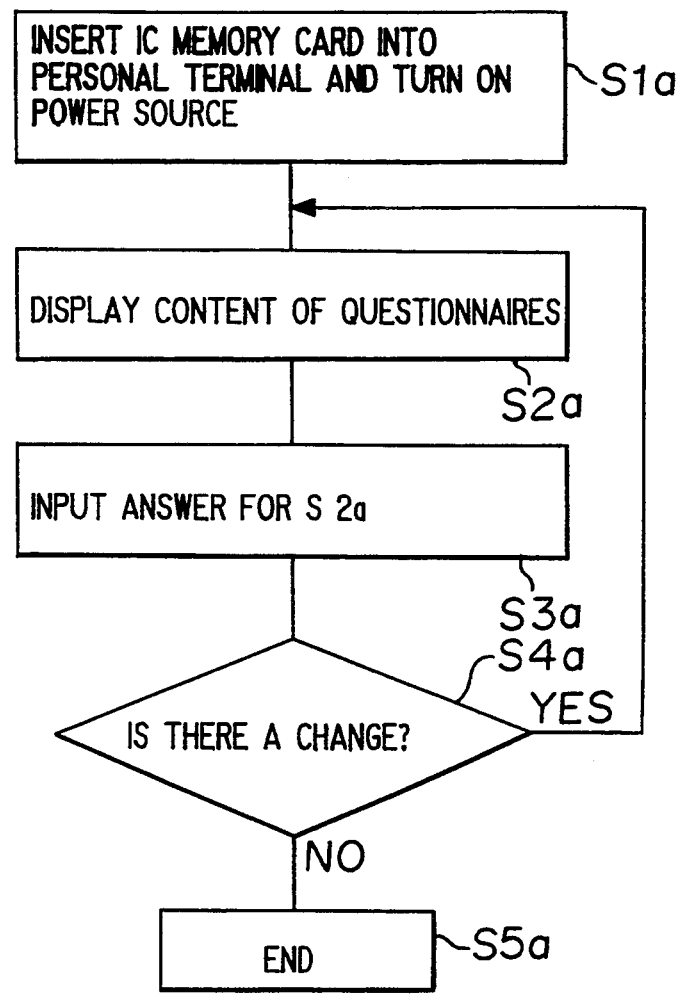

An IC memory card 21, in which answers to the questionnaires are inputted in accordance with the process as shown in FIG. 16, is inserted into the insertion port 32 of an access terminal 3 (step S1b). The access terminal 3 reads the content of the questionnaires and the personal data (step S2b), and the content of the questionnaires are transmitted from the access terminal 3 to the host computer 1 (step S3b) so that the host computer 1 gathers results of the questionnaires from all of the access terminals 3. Further, the host computer 1 counts a premium for each of the answers (step S4b) and the routine is ended (step S5b).

Thus, the answers to the questionnaires can be easily obtained in a short time by inputting, in the host computer 1 various and many items of questionnaires which are planned by companies which desire to obtain information from such questionnaires or market surveying companies. Further, the collection of questionnaires can be accelerated by a previous notice concerning the questionnaires with or without advertisement by using an advertising medium through access terminals 3.

In the above-mentioned questionnaires collection system of the present invention, the content of the questionnaires is automatically shown to persons who are qualified to answer the questionnaires by inserting the IC memory cards 21 into access terminals 3. Accordingly, labor to determine qualified persons can be reduced, and work for collecting the answers can be smoothly and quickly done by using a host computer at a low cost. Further, answerers can respond to the questionnaire at any time.

Now, description will be made as to a personal terminal operable in association with an IC memory card, which has the function to receive information, such as written and/or graphic information transmitted through radiowaves or public telephone lines.

Figure 19:
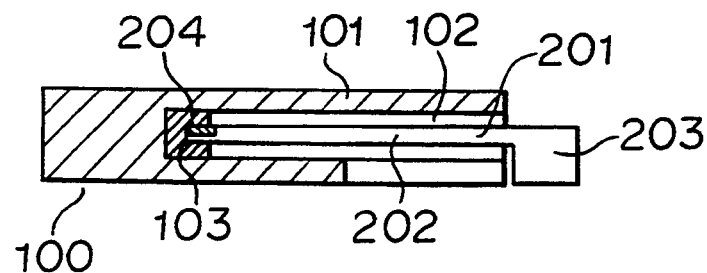
FIG. 19 is a schematic view showing the construction of a portable personal terminal according to a further embodiment of the present invention.

As shown in FIG. 19, a personal terminal 100, capable of receiving information through radiowaves, comprises a portable personal terminal 101 having an inserting portion 102 adapted to receive therein an IC memory card and a signal receiving device 201 connectable to the portable personal terminal 101. The receiving device 201 has a card-like portion 202 which is detachable to an IC memory card inserting portion 102 of the portable personal terminal 101, a connecter 204 formed at an end portion of the card-like portion, which is capable of contacting a connecter provided inside the inserting portion 102, and a signal receiving device main body 203 provided at the other end of the card-like portion 201, the main body 203 being provided with a character information receiving circuit and a character information demodulation circuit which can receive information through radiowaves or telephone lines. The connecter 204 may be provided at any suitable position other than end portion of the card-like portion 22 depending on the position of the connector 103 formed inside the inserting portion 102.

The personal terminal 101 has a displaying portion 52, a selecting button 54 a recording/displaying button 55ƒ a canceling button 56, a cursor positioning button or cursor positioning keys 57 or the like in the same manner as the terminal as shown in FIGS. 8a–8b.

The inner structure of the portable personal terminal 100 is the same as the personal terminal as shown in FIG. 9 except that the interface 66 is used not only for an IC memory card but also a signal receiving device.

Figure 20:
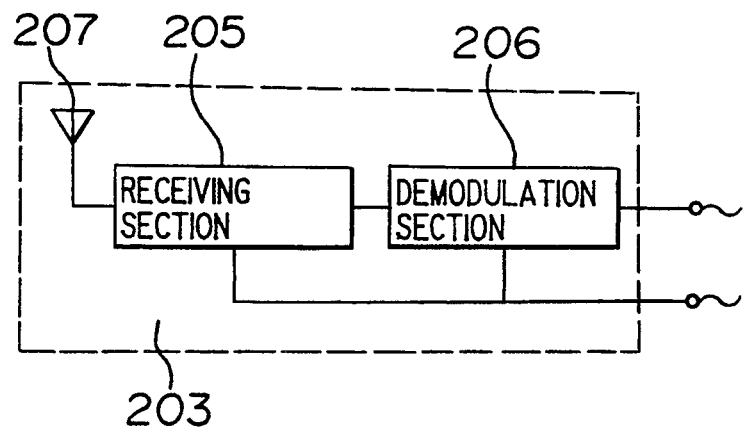
FIG. 20 is a diagram showing the inner structure of the portable personal terminal of FIG. 19.

The inner structure of the signal receiving device main body 203 is shown in FIG. 20.

The signal receiving device main body 203 comprises a signal receiving section 205 for receiving character information and/or graphic information through radiowaves, a demodulation section 206 consisting of a character information demodulation circuit and an antenna 207. The signal receiving device 201 is operable with a supply of power from a power source 67 of the portable personal terminal 101 and has a data bus similar to that of the IC memory card, which has a specification based on that of the IC memory card 21, i.e. it has an 8 bit parallel structure so as to be capable of exchanging data in parallel.

An information processing system to which the portable personal terminal of the present invention is applicable will be described with reference to FIG. 21.

The information processing system comprises a host computer H connected through communication lines to computers at information service sources G such as traffic information service centers, disaster protection centers, weather offices and restaurant shop information service centers each located in different districts. Also included is a signal transmission device I for transmitting service information on radiowaves and a portable terminal device comprising the signal receiving device 201 adapted to receive the radiowaves transmitted through the signal transmission apparatus I and the portable personal terminal 101 as shown in FIG. 21.

Figure 21:
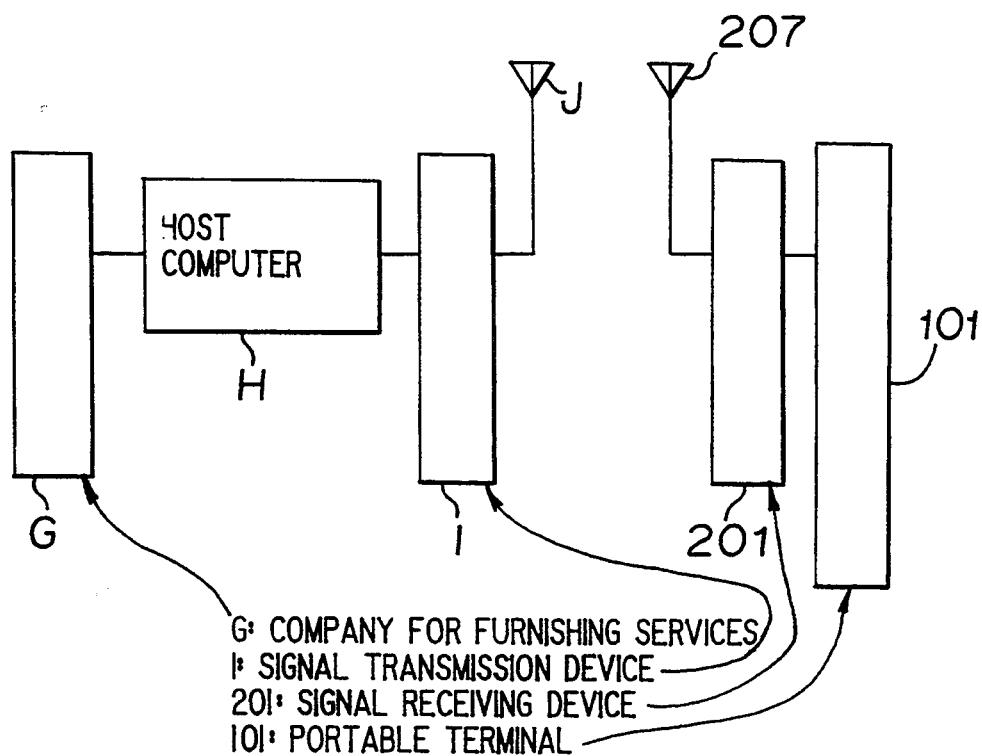
FIG. 21 is a diagram showing an information processing system using radiowaves to which the portable personal terminal of the present invention is applicable.

In FIG. 21, character J and numeral 207 designate antennas. Information through characters or letters which has been received from the companies G for supplying services through communication lines is transmitted with or without modifications through the signal transmission device I. When the information from the companies G for supplying information services is not character or letter information, the information is processed into information of characters or letters at an operation center where the host computer H is installed.

The operation center may transmit the information through radiowaves to a wide area by a transmission device having a capacity of about 10–50 KW which is the same level as the radiowaves of a commercial broadcast office. Alternatively the operating center may produce radiowaves of a relatively low power such as 1–5 W to a narrower area by means of signal transmission devices installed at road sides at predetermined intervals, e.g. at 1 Km intervals.

In the latter case, existing facilities such as signal posts, street lighting poles, power transmission towers can be used. Further, the signal transmission device may receive signals transmitted through a transmission apparatus in the operation center and amplify the signals to be transmitted therethrough, or many transmission devices, installed at road sides can be connected to the host computer H at the operation center through communication lines so as to transmit and receive the signals.

In a case that various kinds of information are transmitted from the operation center, it is desirable that the transmitted information is divided into an amount to be accommodated in the displaying area of the portable personal terminal 101 (for instance, about 256 characters) and the divided information is successively transmitted.

For instance, each information file can be divided into sections: A1, A2, A3, ... B1, B2, B3, ... C1, C2, C3, ..., as shown in FIGS. 22a–22c, and an information file is transmitted in the order of A1, A2, A3, A4, A5, B1, B2, B3, B4, B5 ... Alternatively each information file can be transmitted partially as a A1, B1, C1 ..., as shown in FIG. 23.

The initial portion of the divided information has an ID portion 300 including discriminating information called a file ID and a serial number by which a block in which the information is stored can be discriminated whereby information desired by a customer can be selectively received through the portable terminal of the present invention. In FIG. 23, a numeral 301 and 302 designates the end of information, which is transmitted every time the transmission of an information file is finished.

The radiowaves used may be VHF or UHF radiowaves.

Description will now be made as to processes for receiving information from radiowaves by using the portable personal terminal and for viewing the received information.

The power switch of the portable personal terminal 101 is turned on. Since the ID of an information menu is stored in the ROM 62 of the portable personal terminal 101 (FIG. 9), the ID of an information menu transmitted through the signal receiving device 201 is discriminated, and a datum of the information menu is stored in the RAM 63. When the information menu is received via the radiowaves or telephone lines, it is stored in the RAM 63, and a sound is produced to notify to a user that the information menu has been received.

By operating the recording/displaying button 55, the information menu is displayed on the displaying portion 52 of the portable personal terminal 101. The user selects a desired information, e.g. weather information, among the information menu displayed on the displaying portion 52 of the portable personal terminal 101 as shown in FIG. 24a, by operating the cursor keys to move the cursor.

Thus, the user can select the desired information by operating the selecting button 54. A plurality of items of information can be selected as shown in FIG. 24b. After the selection of information and the operation of the recording/displaying button 55 have been finished, the portable personal terminal 101 starts to receive the information selected by the user. At this moment, an indication such as "Information is being received now" may be displayed.

Figures 24A, 24B, 24C, 24D:
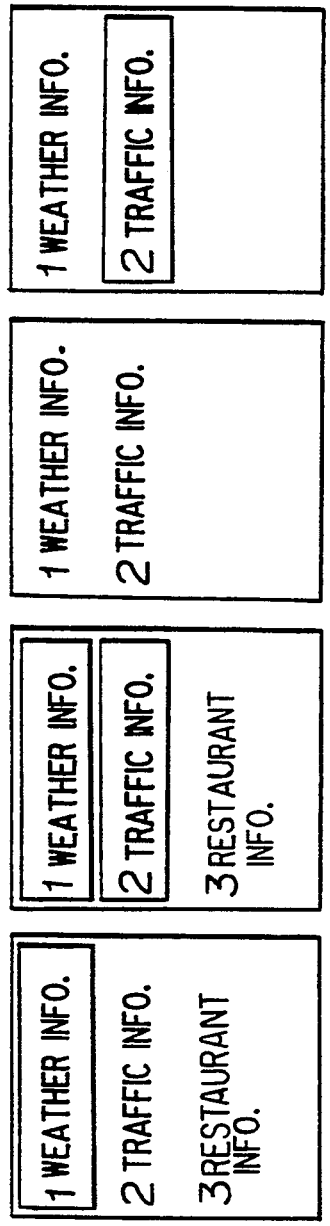
FIG. 24a through 24d are diagrams showing examples of information menus.

When the information selected has been completely received, a sound is again produced to inform the completion of receipt of the information and at the same time an indication of information received is displayed on displaying portion as shown in FIG. 24c. The user operates the cursor keys 57 to move the cursor to "traffic information" as shown in FIG. 24d. When the user operates the recording/displaying button 55, the content of the traffic information received is displayed.

In a case that the user selects a plurality of different types of information and he desires to see the next type of information, a display as shown in FIG. 24c, is obtainable by operating the selecting button 54 once more. In the same manner as above, the next information can be seen by operating the cursor keys 57 to move the cursor to an item desired to be seen and by operating the recording/displaying button 55.

In the above-mentioned description, the information menu is based on information transmitted from the operation center and the information is received by the portable personal terminal 101 for display. However, the information menu may be previously stored in the form of a program in the ROM in the portable personal terminal 101. With this arrangement, the information menu can be displayed on the displaying portion 52 by operating the recording/displaying button 55 of the portable personal terminal 101 so that the information can be quickly selected.

According to the present invention, the portable personal terminal is adapted to receive information of characters or letters and/or graphic information from a signal receiving device not only through radiowaves but also public telephone lines, and the user can see the content of information at any time. Also the portable personal terminal of the present invention is adapted to receive character information services in a vehicle through radiowaves. In this case, a data pack, in which a previously edited information is stored, is mounted on the computer H as shown in FIG. 21. For the data pack, a hard magnetic disc, a battery back-up semiconductor memory or the like is preferably used. The information to be provided can include information concerning departure and arrival of trains, changing trains, sightseeing, newspapers and so on.

Thus, the function of the portable personal terminal can be achieved by inserting an IC memory card and various kinds of information can be received through radiowaves and displayed on the portable personal terminal by mounting the signal receiving device. Since the signal receiving device has a card-like portion which resembles the shape of the IC memory card, the portable personal terminal can be compact by inserting the signal receiving device in the insertion port of the terminal.

Accordingly, the personal terminal is not bulky and is very convenient to carry.

Obviously, numerous modifications and variations of the present invention are possible in light of the above teachings. It is therefore to be understood that within the scope of the appended claims, the invention may be practiced otherwise than as specifically described herein.

We claim:

1. An information collecting system for collecting information corresponding to a demand item by accessing a data base, having a communication interface, which stores information corresponding to said demand item, comprising:
   an IC memory card, including:
   a memory means;
   input and output means for receiving and outputting data information, respectively;
   a menu area for storing one or more menus, each of which includes a listing of information which can be accessed by a user from said data base; and
   a data base for storing said demand item and also data obtained from said data base;
   an access terminal, having a communication interface, for connection to said data base through a network and a host computer, including:
   means for storing one or more menus, each of which includes a listing of information which can be accessed by a user from said data base;
   a menu checking means for comparing said one or more menus stored on said IC memory card with said one or more menus stored in said access terminal; and
   means for recording, onto said menu area of said IC memory card, any menus which exist in said access terminal and are not stored on said IC memory card;
   a portable personal terminal including a menu displaying means for displaying said one or more menus stored on said IC memory card from which the user can select desired data from said data base corresponding to said demand item, and also for displaying said data obtained from said data base which has been stored in the data area of said IC memory card; and
   means for recording said demand item onto the IC memory card.

2. A portable personal terminal assembly, comprising:
   a portable personal terminal having an insertion port for receiving an IC memory card, and having an information displaying means for displaying information stored on said IC memory card to a user, an information selecting means and an information inputting means for input of information by said user to be recorded onto said IC memory card; and
   at least one of a radio wave and a telephone line information receiving device connected to an input of the portable personal terminal, so that said portable personal terminal can receive information from said information receiving device,
   wherein the information receiving device has a card-like portion which is adapted for removable insertion into said IC memory card insertion port formed in the portable personal terminal, and the card-like portion of said receiving device is provided with a character information receiving circuit and a character information demodulation circuit for receiving said information using at least one of radio waves and telephone lines.

3. A data storage and retrieval system, comprising:
   a data base containing data;
   an IC memory card, comprising:
   (1) input and output means for receiving information and outputting information;
   (2) a first memory area for storing a list of information corresponding to said data contained in said data base,
   (3) a second memory area for storing one or more items selected by the user from said list of information contained in said data base, and
   (4) a third memory area for storing a portion of said data contained in said data base, said portion of said data corresponding to said one or more items selected by the user from said list;
   an access terminal, comprising:
   (1) means for retrieving said list of information from said data base,
   (2) means for storing said list of information into said first memory area of said IC memory card,
   (3) means for retrieving data from said IC memory card which has been input thereto by the user, and
   (4) means for outputting said data from said IC memory card to said access terminal; and
   a portable personal terminal, comprising:
   (1) an insertion part for receiving said IC memory card;
   (2) input means for inputting of information by the user to be recorded onto said IC memory card; and
   (3) a display means for:
   displaying said list of information corresponding to said data contained in said data base which has been retrieved from said data base onto said IC memory card upon insertion of said IC memory card into said access terminal, and displaying said portion of said data contained in said data base after the user has selected said one or more items from said list of information upon insertion of said IC memory card into said portable personal terminal and subsequent insertion thereof into said access terminal in order to thereby cause retrieval of said portion of said data contained in said data base corresponding to said selected one or more items, and storage into said third memory area of said IC memory card.

4. The data storage and retrieval system according to claim 3, wherein said IC memory card further comprises:

(5) a fourth memory area for storing additional data input by the user when said IC memory card is inserted into said portable personal terminal.

5. The data storage and retrieval system according to claim 4, further comprising:

a host computer, connected to said access terminal, for receiving said additional data from said fourth memory area of said IC memory card when said IC memory card is inserted into said access terminal after being removed from said portable personal terminal.

6. The data storage and retrieval system according to claim 3, further comprising:

a host computer, connected to said access terminal, for receiving said data output from said IC memory card via said access terminal.

7. The data storage and retrieval system according to claim 6, wherein said data output from said IC memory card comprises a service requested by the user.

8. The data storage and retrieval system according to claim 5, wherein said additional data received by said host computer comprises answers to a questionnaire input into said fourth memory area of said IC memory card when said IC memory card is inserted into said portable personal terminal by the user.

* * * * *